United States Patent
Xu et al.

(10) Patent No.: US 10,420,054 B2
(45) Date of Patent: Sep. 17, 2019

(54) WIRELESS COMMUNICATIONS IN A SYSTEM THAT SUPPORTS A FIRST SUBFRAME TYPE HAVING A FIRST SYMBOL DURATION AND A SECOND SUBFRAME TYPE HAVING A SECOND SYMBOL DURATION

(71) Applicant: QUALCOMM Incorporated, San Diego, CA (US)

(72) Inventors: Hao Xu, San Diego, CA (US); Durga Prasad Malladi, San Diego, CA (US); Naga Bhushan, San Diego, CA (US); Tingfang Ji, San Diego, CA (US); Peter Gaal, San Diego, CA (US); Wanshi Chen, San Diego, CA (US); Tao Luo, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/636,361

(22) Filed: Mar. 3, 2015

(65) Prior Publication Data
US 2015/0280871 A1   Oct. 1, 2015

Related U.S. Application Data

(60) Provisional application No. 61/972,111, filed on Mar. 28, 2014.

(51) Int. Cl.
*H04W 72/04*   (2009.01)
*H04W 56/00*   (2009.01)
(Continued)

(52) U.S. Cl.
CPC .......... *H04W 56/0065* (2013.01); *H01Q 5/25* (2015.01); *H04J 1/16* (2013.01);
(Continued)

(58) Field of Classification Search
CPC ... H04B 7/2048; H04L 12/4666; H04L 47/78; H04L 1/0018; H01Q 5/25
See application file for complete search history.

(56) References Cited

U.S. PATENT DOCUMENTS

| 8,031,583 B2 | 10/2011 | Classon et al. |
| 2005/0135491 A1* | 6/2005 | Santhoff ............... G01S 13/765 375/259 |

(Continued)

FOREIGN PATENT DOCUMENTS

| CN | 101543125 A | 9/2009 |
| CN | 101151818 B | 8/2011 |

(Continued)

OTHER PUBLICATIONS

ISA/EPO, International Search Report and Written Opinion of the International Searching Authority, Int'l App. No. PCT/US2015/018697, dated May 13, 2015, European Patent Office, Rijswijk, NL, 13 pgs.

(Continued)

*Primary Examiner* — Salvador E Rivas
(74) *Attorney, Agent, or Firm* — Liem T. Do

(57) ABSTRACT

Methods, systems, and devices are described for low latency communications within a wireless communications system. An eNB and/or a UE may be configured to operate within the wireless communications system and may send triggers to initiate communications using a dedicated resource in a wireless communications network that supports transmissions having a first subframe type and a second subframe type, the first subframe type comprising symbols of a first
(Continued)

duration and the second subframe type comprising symbols of a second duration that is shorter than the first duration. Communications may be initiated by transmitting a trigger from the UE or eNB using the dedicated resource, and initiating communications following the trigger. The duration of time between the trigger and initiating communications can be significantly shorter than the time to initiate communications using legacy LTE communications.

11 Claims, 24 Drawing Sheets

(51) Int. Cl.

| | |
|---|---|
| *H04J 3/14* | (2006.01) |
| *H04J 1/16* | (2006.01) |
| *H04J 3/16* | (2006.01) |
| *H01Q 5/25* | (2015.01) |
| *H04L 5/00* | (2006.01) |
| *H04L 5/06* | (2006.01) |
| *H04L 1/00* | (2006.01) |
| *H04L 5/14* | (2006.01) |

(52) U.S. Cl.
CPC .............. *H04J 3/14* (2013.01); *H04J 3/1694* (2013.01); *H04L 5/0035* (2013.01); *H04L 5/0044* (2013.01); *H04L 5/0053* (2013.01); *H04L 5/0064* (2013.01); *H04L 5/0092* (2013.01); *H04L 5/06* (2013.01); *H04W 72/0446* (2013.01); *H04L 1/0018* (2013.01); *H04L 5/001* (2013.01); *H04L 5/0023* (2013.01); *H04L 5/14* (2013.01)

(56) References Cited

U.S. PATENT DOCUMENTS

2007/0064669 A1* 3/2007 Classon ................ H04L 1/1822
370/347

2011/0013554 A1* 1/2011 Koskinen .............. H04L 5/0094
370/315
2011/0268070 A1* 11/2011 Guan .................... H04L 5/0007
370/329
2013/0195072 A1* 8/2013 Zhu ....................... H04L 5/0094
370/330

FOREIGN PATENT DOCUMENTS

| | | |
|---|---|---|
| CN | 102362459 A | 2/2012 |
| EP | 2398181 A2 | 12/2011 |
| JP | 2008535392 A | 8/2008 |
| WO | WO2006105005 A2 | 10/2006 |

OTHER PUBLICATIONS

Lahetkangas et al., "On the TDD Subframe Structure for Beyond 4G Radio Access Network", 2013 Future Network and Mobile Summit (FutureNetworkSummit), Lisboa, Jul. 3-5, 2013, pp. 1-10, XP032506927A, Institute of Electrical and Electronics Engineers.

Levanen et al., "Low Latency Radio Interface for 5G Flexible TDD Local Area Communications," 2014 IEEE International Conference on Communications Workshops (ICC), Jun. 10-14, 2014, Sydney, NSW, pp. 7-13, XP032630785A, Institute of Electrical and Electronics Engineers.

Lu et al., "Uplink Control for Low Latency HARQ in TDD Carrier Aggregation", 2012 IEEE 75th Vehicular Technology Conference (VTC Spring), May 6-9, 2012, Yokohama, 5 pgs., XP032202607A, ISBN: 978-1-4673-0989-9, Institute of Electrical and Electronics Engineers.

Wunder et al., "5GNOW: Non-Orthogonal, Asynchronous Waveforms for Future Mobile ‚Aplications", IEEE Communications Magazine, vol. 52, issue 2, Feb. 2014, pp. 97-105, XP011539680A, ISSN: 0163-6804, Institute of Electrical and Electronics Engineers.

IPEA/EPO, Second Written Opinion of the International Preliminary Examining Authority, Int'l. App. No. PCT/US2015/018697, dated Feb. 25, 2016, European Patent Office, Rijswijk, NL, 8 pgs.

European Search Report—EP18151946—Search Authority—The Hague—dated Apr. 9, 2018.

\* cited by examiner

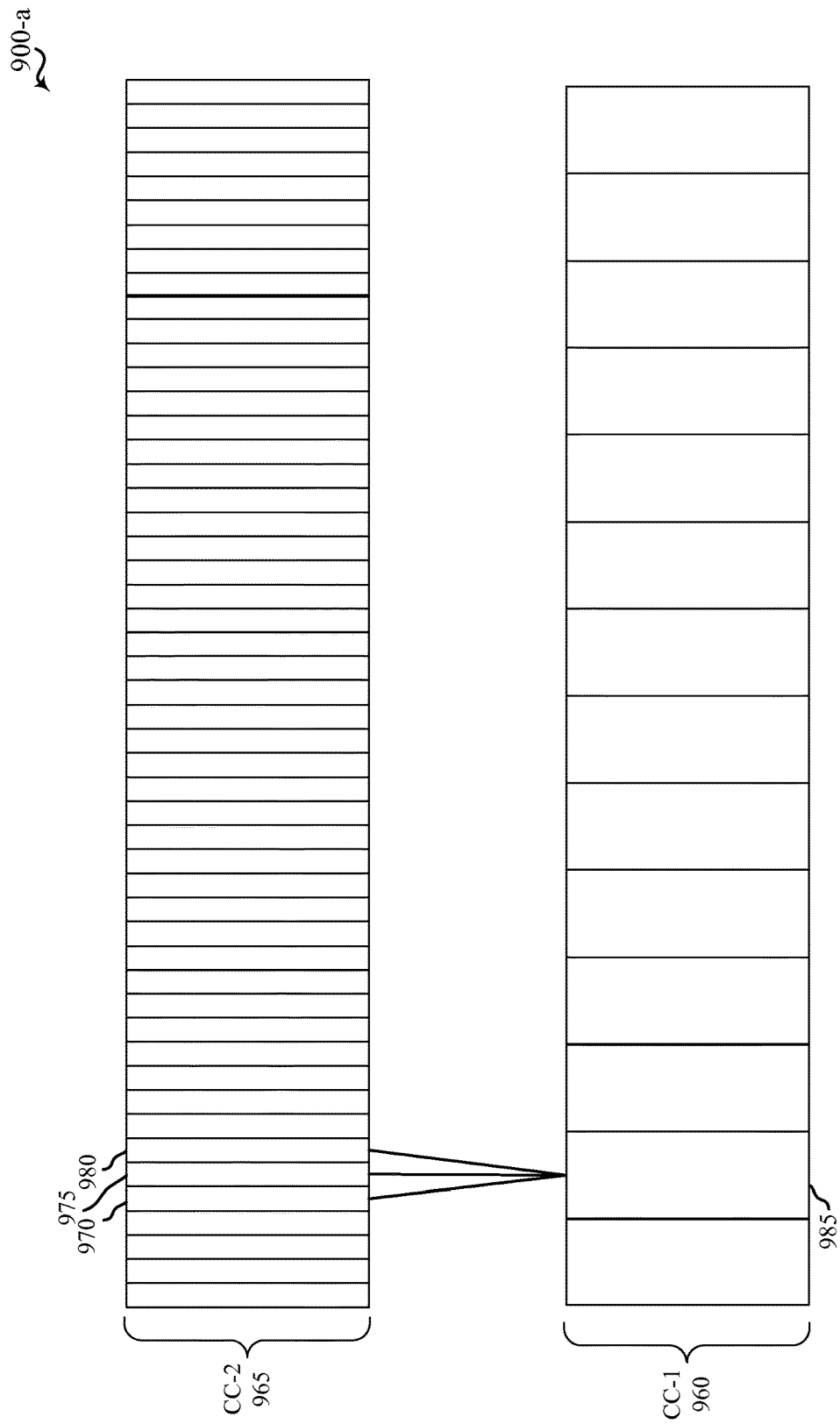

WIRELESS COMMUNICATIONS IN A SYSTEM THAT SUPPORTS A FIRST SUBFRAME TYPE HAVING A FIRST SYMBOL DURATION AND A SECOND SUBFRAME TYPE HAVING A SECOND SYMBOL DURATION

CROSS REFERENCES

The present application for patent claims priority to U.S. Provisional Patent Application No. 61/972,111 by Xu et al., entitled "Ultra Low Latency Design for LTE," filed Mar. 28, 2014, assigned to the assignee hereof, and expressly incorporated by reference herein.

BACKGROUND

The following relates generally to wireless communication, and more specifically to techniques for low latency communications in wireless communications systems.

A wireless communication network may include a number of base stations that can support communication for a number of mobile devices. A mobile device may communicate with a base station via downlink (DL) and uplink (UL) transmissions. The downlink (or forward link) refers to the communication link from the base station, such as an enhanced NodeB (eNB), to a mobile device, also referred to as a user equipment (UE). The uplink (or reverse link) refers to the communication link from the mobile device to the base station.

Multiple access technologies may use Frequency Division Duplexing (FDD) or Time Division Duplexing (TDD) to provide uplink and downlink communications over one or more carriers. TDD operation may provide relatively flexible deployments without requiring paired spectrum resources. TDD formats include transmission of frames of data, each including a number of different subframes in which different subframes may be uplink or downlink subframes. In systems that operate using TDD, different formats may be used in which uplink and downlink communications may be asymmetric. FDD operation utilizes different carriers for concurrent uplink and downlink communications.

In some wireless communication networks, base stations and UEs may support operation on multiple carriers, which may be referred to as carrier aggregation. Carrier aggregation may be used to increase throughput between a base station supporting multiple component carriers and a mobile device, and mobile devices may be configured to communicate using multiple component carriers associated with multiple base stations.

In some instances, a mobile device may need to initiate communications with a base station, or the base station may need to initiate communications with the mobile device. In many existing deployments the time period between a trigger and the initiation of data communications after the trigger may be on the range of several milliseconds. In certain situations, it may be desirable to have a reduced latency between a trigger and initiation of communications.

SUMMARY

The described features generally relate to one or more improved systems, methods, and devices for low latency communications within a wireless communications system. An eNB or a UE, or both, may be configured to operate within the wireless communications system and may send triggers to initiate communications using a dedicated resource in a wireless communications network that supports transmissions having a first subframe type and a second subframe type, the first subframe type comprising symbols of a first duration and the second subframe type comprising symbols of a second duration that is shorter than the first duration. Communications may be initiated by transmitting a trigger from the UE or eNB using the dedicated resource, and initiating communications following the trigger. The duration of time between the trigger and initiating communications can be significantly shorter than the time to initiate communications using legacy LTE communications.

According to a first set of illustrative embodiments, a method for wireless communications may include establishing communications in a wireless communications network that supports transmissions having a first subframe type and a second subframe type, the first subframe type including symbols of a first duration and the second subframe type including symbols of a second duration that is shorter than the first duration; and monitoring a predetermined wireless communications resource for a trigger to initiate transmissions having the second subframe type. In some examples, the method may also include determining that the trigger is received; and receiving transmissions having the second subframe type, and where a latency between the determining and receiving is less than a latency between initiating transmissions having the first subframe type and receiving transmissions having the first subframe type.

In certain examples, the monitoring may include monitoring a dedicated frequency resource for the trigger. The dedicated frequency resource may include, for example, a dedicated frequency division multiplexing (FDM) subband continuously available for the monitoring. A bandwidth of the dedicated frequency resource may be based on a number of devices configured to transmit or receive the trigger using the dedicated frequency resource, for example. The dedicated frequency resource may include one or more resource blocks of a physical downlink shared channel (PDSCH), or an enhanced physical downlink control channel (ePDCCH), in some examples. In other examples, the dedicated frequency resource may include two or more discontiguous resource blocks of a FDM resource.

In some examples, the monitoring may include monitoring a dedicated time resource for the trigger. The dedicated time resource may include, for example, a predefined portion of a time division multiplexing (TDM) subframe, the predefined portion including one or more symbols of the TDM subframe having the first duration. The one or more symbols of the TDM subframe may include a first symbol of the TDM subframe and a second symbol of the TDM subframe, in some examples. In certain examples, at least one subsequent symbol of the TDM subframe following the one or more symbols may have the second duration.

In certain examples, the monitoring may be performed by a user equipment (UE), and the method further may include determining that the trigger is received; and determining transmission resources that are to be used for receiving one or more subframes having the second subframe type at the UE. In some examples, the determining that the trigger is received may include one or more of: determining that the trigger is received on a predefined resource associated with the UE; or determining that the trigger includes an identification that identifies the UE.

In other examples, the monitoring may be performed by a base station, and the method further may include determining that the trigger is received from a user equipment (UE); and transmitting an assignment of resources to the UE for transmitting one or more subframes having the second subframe type. In certain examples, the trigger may include one or more of: a UE identification; a delay requirement; or a bandwidth requirement. In certain examples, determining that the trigger is received from the UE may include determining that two or more triggers are received from two or more UEs; and resolving contention between the two or more UEs, and transmitting the assignment may include transmitting the assignment of resources to one of the two or more UEs responsive to the resolving contention between the two or more UEs. In other examples, the monitoring is performed by a base station, and the method further may include determining that the trigger is received from a user equipment (UE); and receiving an autonomous transmission from the UE including subframes having the second subframe type.

According to a second set of illustrative embodiments, a method for wireless communications may include establishing communications in a wireless communications network that supports transmissions having a first subframe type and a second subframe type, the first subframe type including symbols of a first duration and the second subframe type including symbols of a second duration that is shorter than the first duration; determining that data is to be transmitted using one or more subframes having the second subframe type; and transmitting a trigger using a predetermined wireless communications resource to initiate transmissions having the second subframe type.

In certain examples, the predetermined wireless communications resource may include a dedicated frequency resource. The dedicated frequency resource may include, for example, a dedicated frequency division multiplexing (FDM) subband continuously available for monitoring. In other examples, the dedicated frequency resource may include one or more resource blocks of a physical downlink shared channel (PDSCH). Additionally or alternatively, the dedicated frequency resource may include two or more discontiguous resource blocks of a FDM resource.

In some examples, the predetermined wireless communications resource may include a dedicated time resource for the trigger. The dedicated time resource may include, for example, a predefined portion of a time division multiplexing (TDM) subframe, the predefined portion including one or more symbols of the TDM subframe having the first duration. In some examples, one or more symbols of the TDM subframe may include a first symbol of the TDM subframe and a second symbol of the TDM subframe. In certain examples, at least one subsequent symbol of the TDM subframe following the one or more symbols has the second duration.

In some examples, the method may be performed by a user equipment (UE), and the method further may include autonomously transmitting the one or more subframes having the second subframe type. In other examples, the method may be performed by a user equipment (UE), and the method further may include receiving an assignment of uplink resources from a base station responsive to transmitting the trigger; and transmitting the one or more subframes having the second subframe type using assigned uplink resources. In further examples, the method may be performed by a user equipment (UE), and the transmitting the trigger may include one or more of: transmitting the trigger on a predefined resource associated with the UE; transmitting an identification that identifies the UE; transmitting a delay requirement; or transmitting a bandwidth requirement. In some examples, the method may be performed by a base station, and the method further may include transmitting the one or more subframes having the second subframe type following the trigger.

According to a third set of illustrative embodiments, a method for wireless communications may include configuring a first latency mode and a second latency mode in a wireless communications network, wherein transmissions in the first latency mode have a first round trip time (RTT) between transmission and acknowledgment of receipt of the transmission, and transmissions in the second latency mode have a second RTT that is less than the first RTT; and configuring a resource for devices operating in the wireless communications network to trigger use of the second latency mode.

The resource may include, for example, a dedicated time resource or a frequency resource. In some examples, the frequency resource may include a dedicated frequency division multiplexing (FDM) subband continuously available for monitoring. In other examples, the second latency mode may be configured to operate on a dedicated component carrier. Such a dedicated component carrier may be configured as a secondary cell (SCell) component carrier. In some examples, resources on the SCell component carrier may be assigned by a base station using a primary cell (PCell) component carrier, and a plurality of resources in the SCell component carrier may be assigned using a single resource of the PCell component carrier. In other examples, resources on the SCell component carrier may be assigned by a base station using a single scheduling resource within the SCell component carrier. In further examples, an acknowledgment of receipt of transmissions for a plurality of resources in the SCell component carrier is provided by a single resource of the PCell component carrier.

In certain examples, configuring the first latency mode and the second latency mode may include configuring a first subset of resources within a component carrier for first latency mode communications, and configuring a second subset of resources within the component carrier for second latency mode communications. In some examples, the first subset of resources and second subset of resources may be dynamically configured based on an amount of data to be transmitted using the second latency mode.

In further examples, configuring the first latency mode and the second latency mode may include configuring a first component carrier to operate using the first latency mode; and configuring a second component carrier to operate using the second latency mode. The resource may include, for example, a dedicated frequency division multiplexing (FDM) subband within the second component carrier continuously available for monitoring. In some examples, the resource may be dynamically or semi-statically configured. For example, the resource may be a predefined group of resource blocks transmitted using the first latency mode. The resource, in some examples, may be one or more symbols in a time division multiplexing subframe transmitted using the first latency mode.

According to a fourth set of illustrative embodiments, an apparatus for wireless communications may include means for establishing communications in a wireless communications network that supports transmissions having a first subframe type and a second subframe type, the first subframe type including symbols of a first duration and the second subframe type including symbols of a second duration that is shorter than the first duration; and means for monitoring a predetermined wireless communications resource for a trigger to initiate transmissions having the second subframe type.

In certain examples, the apparatus may implement one or more aspects of the first set of illustrative embodiments described above.

According to a fifth set of illustrative embodiments, an apparatus for wireless communications may include means for establishing communications in a wireless communications network that supports transmissions having a first subframe type and a second subframe type, the first subframe type including symbols of a first duration and the second subframe type including symbols of a second duration that is shorter than the first duration; means for determining that data is to be transmitted using one or more subframes having the second subframe type; and means for transmitting a trigger using a predetermined wireless communications resource to initiate transmissions having the second subframe type.

In certain examples, the apparatus may implement one or more aspects of the second set of illustrative embodiments described above.

According to a sixth set of illustrative embodiments, an apparatus for wireless communications may include means for configuring a first latency mode and a second latency mode in a wireless communications network, wherein transmissions in the first latency mode have a first round trip time (RTT) between transmission and acknowledgment of receipt of the transmission, and transmissions in the second latency mode have a second RTT that is less than the first RTT; and means for configuring a resource for devices operating in the wireless communications network to trigger use of the second latency mode.

In certain examples, the apparatus may implement one or more aspects of the third set of illustrative embodiments described above.

According to a seventh set of illustrative embodiments, an apparatus for wireless communications may include a processor; memory in electronic communication with the processor; and instructions stored in the memory. The instructions may be executable by the processor to: establish communications in a wireless communications network that supports transmissions having a first subframe type and a second subframe type, the first subframe type including symbols of a first duration and the second subframe type including symbols of a second duration that is shorter than the first duration; and monitor a predetermined wireless communications resource for a trigger to initiate transmissions having the second subframe type.

In certain examples, the instructions may be configured to cause the processor to implement one or more aspects of the first set of illustrative embodiments described above.

According to an eighth set of illustrative embodiments, an apparatus for wireless communications may include a processor; memory in electronic communication with the processor; and instructions stored in the memory. The instructions may be executable by the processor to: establish communications in a wireless communications network that supports transmissions having a first subframe type and a second subframe type, the first subframe type including symbols of a first duration and the second subframe type including symbols of a second duration that is shorter than the first duration; determine that data is to be transmitted using one or more subframes having the second subframe type; and transmit a trigger using a predetermined wireless communications resource to initiate transmissions having the second subframe type.

In certain examples, the instructions may be configured to cause the processor to implement one or more aspects of the second set of illustrative embodiments described above.

According to a ninth set of illustrative embodiments, an apparatus for wireless communications may include a processor; memory in electronic communication with the processor; and instructions stored in the memory. The instructions may be executable by the processor to: configure a first latency mode and a second latency mode in a wireless communications network, wherein transmissions in the first latency mode have a first round trip time (RTT) between transmission and acknowledgment of receipt of the transmission, and transmissions in the second latency mode have a second RTT that is less than the first RTT; and configure a resource for devices operating in the wireless communications network to trigger use of the second latency mode.

In certain examples, the instructions may be configured to cause the processor to implement one or more aspects of the third set of illustrative embodiments described above.

According to a tenth set of illustrative embodiments, a computer program product for wireless communications may include a non-transitory computer-readable medium storing instructions executable by a processor to: establish communications in a wireless communications network that supports transmissions having a first subframe type and a second subframe type, the first subframe type including symbols of a first duration and the second subframe type including symbols of a second duration that is shorter than the first duration; and monitor a predetermined wireless communications resource for a trigger to initiate transmissions having the second subframe type.

In certain examples, the instructions may be configured to cause the processor to implement one or more aspects of the first set of illustrative embodiments described above.

According to an eleventh set of illustrative embodiments, a computer program product for wireless communications may include a non-transitory computer-readable medium storing instructions executable by a processor to: establish communications in a wireless communications network that supports transmissions having a first subframe type and a second subframe type, the first subframe type including symbols of a first duration and the second subframe type including symbols of a second duration that is shorter than the first duration; determine that data is to be transmitted using one or more subframes having the second subframe type; and transmit a trigger using a predetermined wireless communications resource to initiate transmissions having the second subframe type.

In certain examples, the instructions may be configured to cause the processor to implement one or more aspects of the second set of illustrative embodiments described above.

According to a twelfth set of illustrative embodiments, a computer program product for wireless communications may include a non-transitory computer-readable medium storing instructions executable by a processor to: configure a first latency mode and a second latency mode in a wireless communications network, wherein transmissions in the first latency mode have a first round trip time (RTT) between transmission and acknowledgment of receipt of the transmission, and transmissions in the second latency mode have a second RTT that is less than the first RTT; and configure a resource for devices operating in the wireless communications network to trigger use of the second latency mode.

In certain examples, the instructions may be configured to cause the processor to implement one or more aspects of the third set of illustrative embodiments described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9B is a diagram conceptually illustrating another example of radio frames for different component carriers and transmission acknowledgment that may be provided for different component carriers of a wireless communication system, in accordance with aspects of the present disclosure;

DETAILED DESCRIPTION

Figure 1:
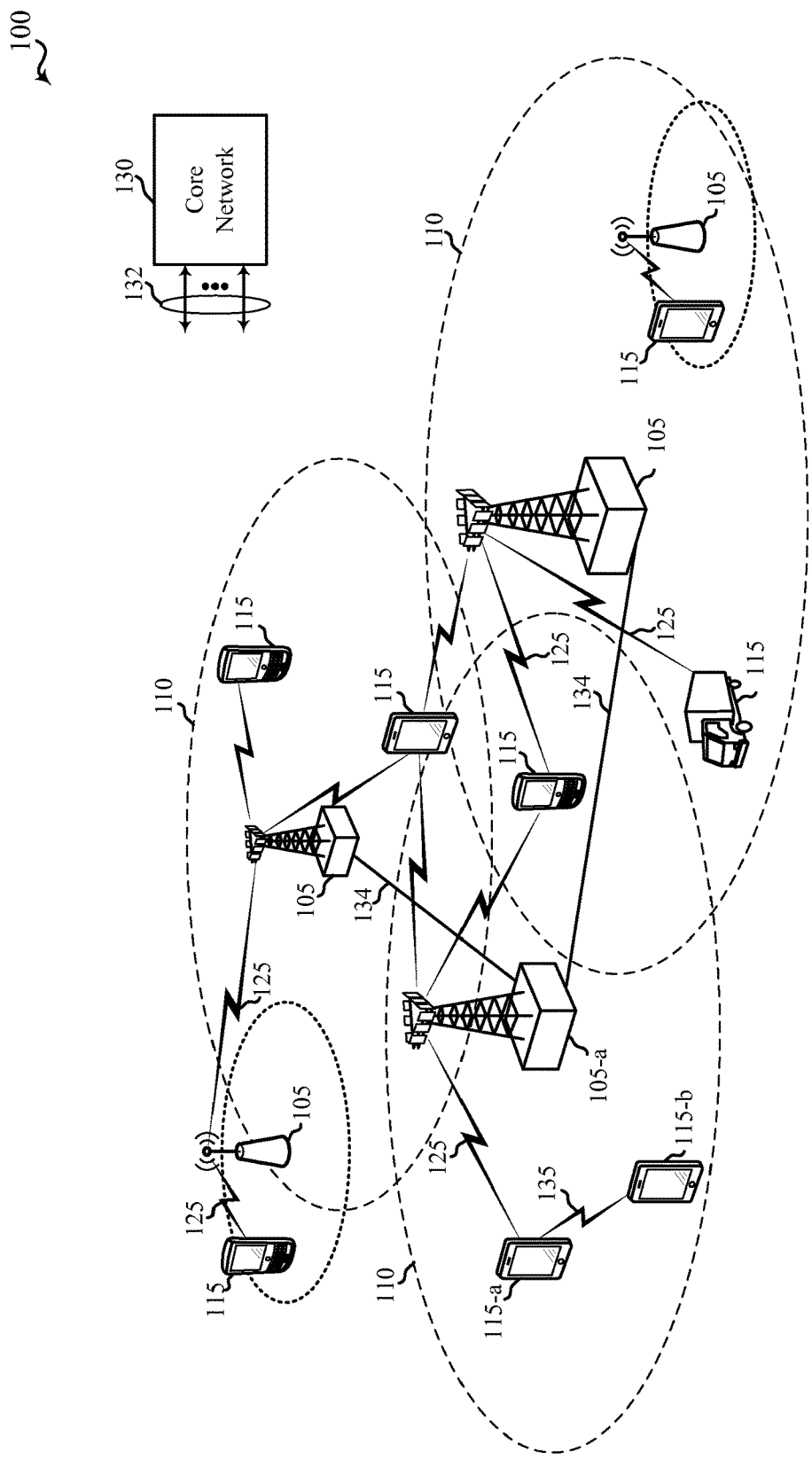
FIG. 1 shows a diagram conceptually illustrating an example of a telecommunications system, in accordance with aspects of the present disclosure.

Techniques are described for low latency communications within a wireless communications system. An eNB or a UE, or both, may be configured to operate within the wireless communications system and may send triggers to initiate communications using a dedicated resource in a wireless communications network that supports transmissions having a first subframe type and a second subframe type. The first subframe type may include subframes having symbols of a first duration and subframes of the second subframe type may include symbols of a second duration that is shorter than the first duration. Communications may be initiated by transmitting a trigger from the UE or eNB using the dedicated resource, and initiating communications following the trigger. The duration of time between the trigger and initiating communications can be significantly shorter than the time to initiate communications using legacy Long Term Evolution (LTE) communications.

According to various examples, various devices in a wireless communications network, including base stations and UEs, may be configured to operate according to a first latency mode and a second latency mode. The first latency mode may use subframes of the first subframe type and have a first round trip time (RTT) between transmission and acknowledgment of receipt of the transmission. Transmissions in the second latency mode may use the second subframe type and have a second RTT that is less than the first RTT. A resource may be configured for devices operating in the wireless communications network to trigger use of the second latency mode. Such a resource may be, for example, a dedicated frequency resource such as a dedicated frequency division multiplexing (FDM) subband, or a dedicated component carrier configured by a base station, which informs UEs of the configuration. In some examples, the dedicated FDM subband resource is. continuously available for monitoring. In some examples, the dedicated resource may be a dedicated time resource, such as a first or second symbol of a time division multiplexing (TDM) subframe.

A UE may operate in the first latency mode and monitor downlink communications on the dedicated resource. If a trigger is transmitted on the dedicated resource, the UE may switch to the second latency mode to initiate fast communications. Thus, the trigger may replace legacy paging or assignments for initiation of downlink communications when operating in the second latency mode. On uplink communications, a base station may operate in the first latency mode and monitor a dedicated uplink resource, such as a dedicated FDM subband or dedicated symbols in TDM uplink subframes, for a trigger from a UE to initiate communications using the second latency mode. In some examples, the base station may transmit an assignment of resources for the UE to use in uplink communications using the second latency mode. In other examples, the UE may autonomously initiate uplink communications using the second latency mode following the trigger. Thus, such a trigger from a UE may replace legacy random access or scheduling request procedures when the UE is to switch to the second latency mode.

The first latency mode may correspond to legacy LTE operation, in which downlink communications are initiated through downlink or paging control channels and uplink communications are initiated through a scheduling request or random access procedures. Such legacy LTE operation may include latencies from various sources between a determination that data is to be transmitted, and initiation of a transmission containing the data. For example, once a UE has established a connection with a base station, for uplink transmissions, a scheduling request may be transmitted or random access procedure may be initiated, which ultimately may result is resources assigned to the UE. Such processes may take on the order of a few milliseconds, to tens of milliseconds. Similarly, for downlink communications, a base station may use a paging procedure or use control channel messages to indicate that a UE is to receive data, and such processes may take on the order of a few milliseconds to tens of milliseconds. During communications, a round trip time (RTT) between a transmission and acknowledgement of receipt of the transmission may take from 8 ms up to over 10 ms.

The second latency mode may provide communications that can significantly reduce one or more of the legacy LTE latencies. In some examples, the second latency mode may correspond to a fast access mode in which the duration of time between the trigger and initiating communications can be significantly shorter than the time to initiate communications using legacy LTE communications, and on the order of 1 ms or less in certain examples. Furthermore, the second latency mode may provide reduced RTT through the use of symbols having a duration that is less than a symbol duration of legacy LTE symbols.

Reduced latency may provide for enhanced data transfer rates and enhanced initiation of communications which may be beneficial, for example, for emergency response communications, peer to peer communications in unmanned vehicles or autonomously controlled vehicles, vehicle collision avoidance, etc. Accordingly, receivers configured to operate in fast communications mode, either exclusively or in combination with operation in the legacy communications mode, may support enhanced response times and enhanced data rates relative to receivers configured to operate exclusively in the legacy communications mode.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or the certain access points 105 (e.g., base stations or eNBs) in various examples. Access points 105 may communicate control information or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate according to multiple latency modes in which one or more of the UEs 115 and one or more of the access points 105 may be configured to support transmissions in a first, or legacy, latency mode as well as transmissions in a second, or fast access, latency mode that has a reduced latency with respect to the first latency mode. In some examples a hybrid UE 115-a may communicate with access point 105-a using both a first latency mode and a second latency mode. In some examples, UE 115-a may initiate peer-to-peer communications with another UE 115-b via wireless link 135, and may trigger communications with UE 115-b using a dedicated trigger resource configured in the second latency mode. For example, in vehicular communications a UE may, upon detection of approaching vehicles, turn on fast communications through a trigger of the second latency mode. Even though each vehicle may be traveling at relatively high speed, but relative speed between vehicles may be relatively small, and at a relatively short distance peer-to-peer communications can be efficient. In other examples, peer-to-peer communications may be used for gaming devices, such as a remote and console, and direct communications between the devices according to the second latency mode may reduce the need to communicate through a third entity.

In some examples, hybrid UE 115-a when configured to monitor a dedicated trigger resource for switching to the second latency mode, may receive a trigger to initiate fast access communications, and receive wideband communications within a same subframe as receiving the trigger. Such fast access may be desirable in certain applications where response times are desired to be relatively small, and on the order of one millisecond or less. For example, low latency communications may be desired in vehicular communications for collision avoidance or in self-driving vehicles, gaming applications, drone aircraft operation, robotic applications, health sensors, nuclear sensors, or gesture control sensors, to name but a few examples.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, or pico base stations). The access points 105 may also utilize different radio technologies, such as cellular or WLAN radio access technologies. The access points 105 may be associated with the same or different access networks or operator deployments. The coverage areas of different access points 105, including the coverage areas of the same or different types of access points 105, utilizing the same or different radio technologies, or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, or other types of cell. Small cells such as pico cells, femto cells, or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless network 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A UE 115 may be a machine type communication (MTC) device, a cellular phone, a personal digital assistant (PDA), a wireless modem, a wireless communication device, a handheld device, a tablet computer, a laptop computer, a cordless phone, a wireless local loop (WLL) station, or the like. In some implementations, an MTC device may be included in or operate in conjunction with a vehicle, a sensor, or any of numerous other applications that may use MTC devices, such as a meter (e.g., a gas or parking meter), home appliances, healthcare devices, or other monitoring devices. A communication device may be able to communicate with macro base stations, pico base stations, femto base stations, relay base stations, and the like.

The communication links 125 shown in wireless communications system 100 may include uplink (UL) transmissions from a UE 115 to an access point 105, or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Each of the different operating modes that may be employed by wireless communication system 100 may operate according to frequency division duplexing (FDD) or time division duplexing (TDD). In some examples, different latency modes may operate according to different TDD or FDD modes. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions using subframes having the first subframe type and second subframe type. Additional details regarding implementation of multiple latency modes in a system such as the wireless communications system 100, as well as other features and functions related to communications in such systems, are provided below with reference to FIGS. 2-18.

As discussed above, various examples provide communications in a wireless communications system, such as wireless communications system 100 of FIG. 1, according to multiple latency modes. Communications in a first latency mode may use the frame structure, slots, symbols and subcarrier spacing as specified for legacy LTE communications. Additionally, communications in the first latency mode may be initiated through legacy LTE techniques, such as through paging or control channels for downlink communications, and through scheduling requests and random access procedures for uplink communications. Communications in the second latency mode may be initiated through a dedicated resource that may initiate communications with reduced latency relative to legacy LTE communications. Additionally, communications in the second latency mode may use symbols having a reduced symbol duration than legacy LTE symbols, which may provide reduced latency between a transmission and acknowledgment of receipt of the transmission.

Figure 2:
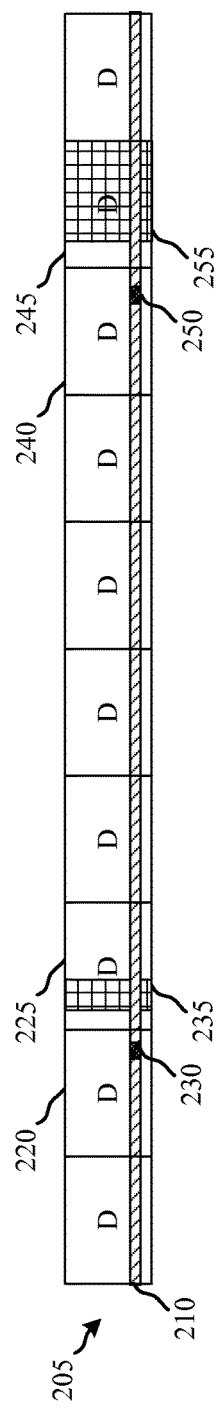
FIG. 2 is a diagram conceptually illustrating an example of a radio frame and dedicated trigger resource that may be transmitted in a wireless communication system, in accordance with aspects of the present disclosure.

FIG. 2 is a diagram 200 conceptually illustrating an example of a radio frame 205 and different subframes that may be transmitted in the radio frame 205. The radio frames of FIG. 2 may be transmitted using portions of the wireless communications system 100 described with reference to FIG. 1 between one or more access points 105 or one or more UEs 115, for example. In this example, a radio frame 205 may be a FDD frame and may include ten 1 ms subframes. The radio frame 205 may be a downlink frame, and in this example includes a dedicated FDM resource 210 that is a frequency resource from each of the subframes. In the example of FIG. 2, a UE, such as a UE 115 of FIG. 1, may communicate according to a first latency mode using legacy LTE communications, and may monitor the dedicated FDM resource 210 for a trigger that initiates a second latency mode. The dedicated FDM resource 210 may be in a constant ON state—e.g., it may be continuously available for monitoring by a UE. In the example of FIG. 2, the base station (e.g., base station 105 of FIG. 1), transmits a trigger 230 using dedicated FDM resource 210, during subframe 220. Following the trigger 230, wideband fast communications 235 are transmitted to the UE during subframe 225. In the example of FIG. 2, a second trigger 250 may be transmitted in subframe 240 followed by wideband fast communications 255 transmitted to the UE during subframe 245. The amount of resources used for wideband fast communications 235 and 255 may be selected by the base station dynamically and indicated in the associated trigger 230 or 250. In such a manner, the time between triggers 230 and 250 and wideband fast communications 235 and 255 may be relatively short, and in some examples may be much less than 1 ms, as data may be transmitted to the UE immediately after the trigger 230 or 250 in either pre-allocated resources or in resources dynamically assigned within the trigger 230 or 250.

The triggers 230 and 250 may include, for example, one or more information elements that may include information that identifies the UE that is to receive the wideband fast communications 235, resources that are assigned for the wideband fast communications 235, or a type of fast communication mode that the UE is to enter. In some examples, different resources in the dedicated FDM resource 210 may be assigned to a particular UE, and thus the UE may simply monitor the assigned resources for the trigger. For example, certain symbols within FDM resource may be assigned to a UE. In other examples, different portions of the dedicated FDM resource 210 may be assigned to groups of UEs. The dedicated FDM resource 210 may be, for example, a dedicated FDM subband or a component carrier configured by the base station for triggering low latency mode communications. The amount of resources used for dedicated FDM resource 210 may be semi-static, or may be dynamically changed based on a number of UEs capable of low latency mode communications that are present at any given time. The FDM resource 210 may be rate matched around legacy signals, and in some examples is a new carrier design that is not accessed by legacy UEs. FDM subbands, according to various examples, may be dynamically assigned between legacy and low latency modes.

In the example of FIG. 2, wideband fast communications 235 and 255 may replace all or a portion of the associated subframes 225 and 245. Wideband fast communications 235 and 255, according to some examples, may have a symbol duration that is shorter than legacy LTE symbol durations, and in some examples a complete subframe transmitted using wideband fast communications may include 88 symbols (although many different symbol variations may be used in other examples), rather than the 14 legacy LTE symbols. In some examples, control symbols may be followed by data symbols in low latency mode transmissions, and uplink acknowledgment/negative acknowledgment may be performed at the beginning of a subframe. In some examples, acknowledgment of transmissions may include only a negative acknowledgment when reception fails, with no separate acknowledgment transmitted following a successful reception. In such a manner, latency may be further improved.

Figure 3:
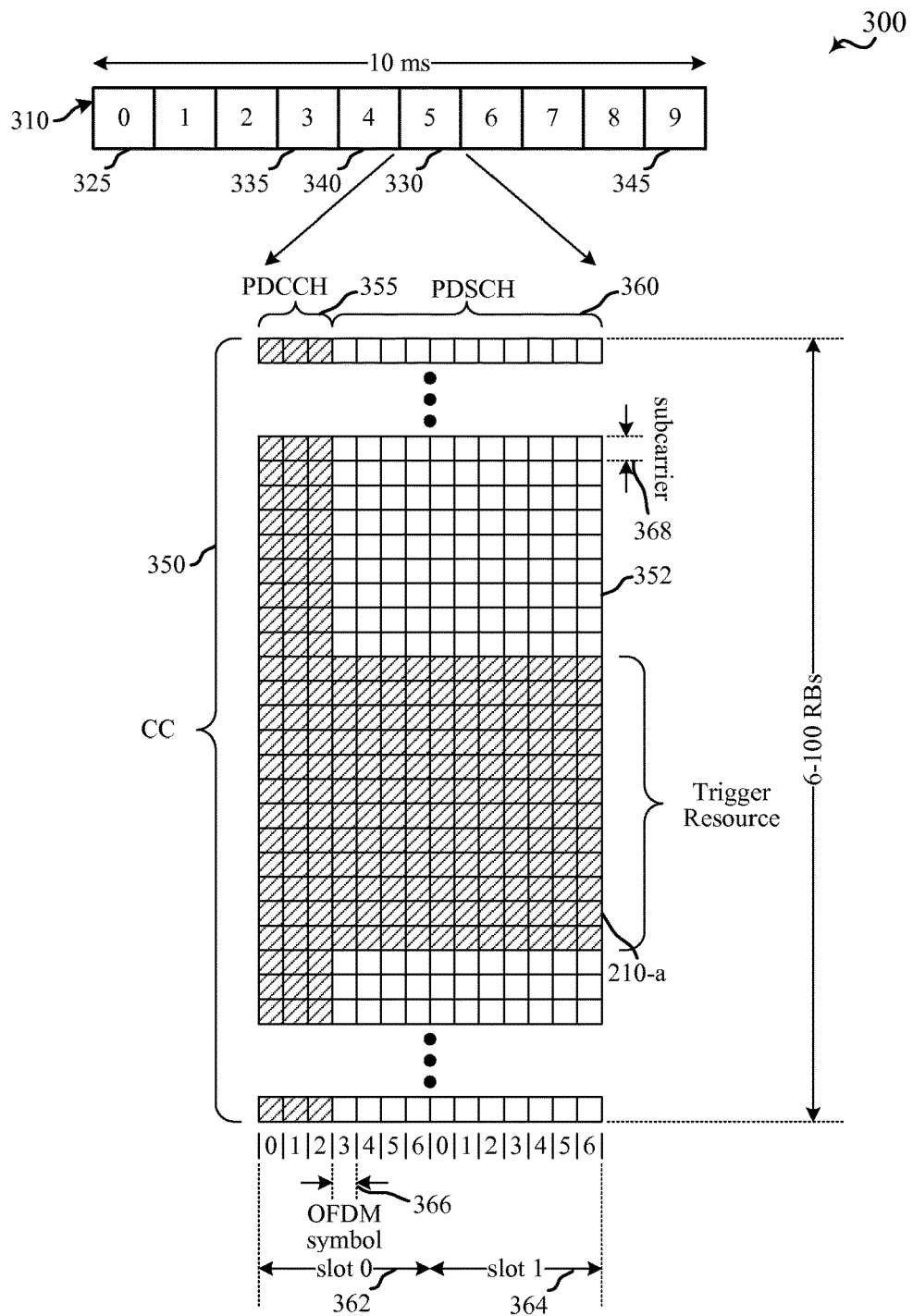
FIG. 3 is a diagram illustrating an example of a downlink frame structure and trigger resources that may be used in a wireless communication system, in accordance with aspects of the present disclosure.

FIG. 3 is a diagram illustrating an example of a downlink frame structure 300 that may be used in a wireless communication system, including the wireless communication system 100 described above with reference to the FIG. 1. For example, the frame structure 300 may be used in LTE/LTE-A or similar systems, and may be an example of the frame structure of FIG. 2. A frame 310 (10 ms) may be divided into 10 equally sized subframes (e.g., subframe 325, 330, 335, 340, 345, etc.). In some examples, frame 310 may be used for transmissions using different latency modes, with one or more subframes within frame 310 used for wideband fast communications and one or more other subframes within frame 310 used for legacy LTE transmissions. As illustrated in FIG. 3, subframes may include two consecutive time slots 362 and 364. An OFDMA component carrier 350 may be illustrated as a resource grid representing the two time slots 362, 364, each time slot including seven OFDM symbols 366, for a normal cyclic prefix.

The resource grid may be divided into multiple resource elements 352. In legacy LTE/LTE-A, a resource block may contain 12 consecutive subcarriers 368 in the frequency domain and, for a normal cyclic prefix in each OFDM symbol 366, 7 consecutive OFDM symbols 366 in the time domain, or 84 resource elements 352. In this example, a trigger resource may be provided as a dedicated FDM resource 210-a that includes one resource block in each slot 326, 364. In some examples, the bandwidth of the FDM resource 210-a may be selected to maintain good decoding performance of the trigger. The dedicated FDM resource 210-a may be narrowband for potential energy saving. In some examples, the dedicated FDM resource 210-a may be selected to be the center six resource blocks, as there are many resources that may not be used for legacy LTE demodulation reference signal (DMRS) based PDSCH. The bandwidth of the dedicated FDM resource may also include non-contiguous resource blocks, thus providing a virtual bandwidth of N resource blocks that are not necessarily consecutive.

The tone spacing for subcarriers 368 may be 15 kHz, and a useful symbol duration for OFDM symbols 366 may be 66.67 μs. OFDM symbols 366 may also include a cyclic prefix that is, for a normal legacy LTE cyclic prefix, 5.1 μs for a first OFDM symbol 366 in each slot 362, 364, or 4.69 μs for other OFDM symbols 366. As noted, in examples where wideband fast communications are transmitted in one or more subframes, such subframes, according to some examples, may include more symbols within the subframe (referred to as burst mode symbols), and each burst mode symbol may have a reduced symbol duration relative to the legacy OFDM (or SC-FDM) symbols 366. Burst mode symbols also may have increased tone spacing for subcarriers relative to legacy symbols, and in some examples have a tone spacing of 120 kHz.

As illustrated in FIG. 3, a physical downlink control channel (PDCCH) 355 may be time-division multiplexed with a physical downlink shared channel (PDSCH) 360 and may be fully distributed within the entire bandwidth of the component carrier 350 within a first region of first layer subframe 330. In the example illustrated in FIG. 3, PDCCH 355 takes up the first three symbols of the subframe 330. PDCCH 355 may have more or fewer symbols as is appropriate based on the component carrier bandwidth and amount of control information for the subframe 330.

The PDCCH may carry downlink control information (DCI) in control channel elements (CCEs). The DCI may include, for example, information regarding the downlink scheduling assignments, uplink resource grants, transmission scheme, uplink power control, hybrid automatic return repeat request (HARM) information, modulation and coding schemes (MCS) and other information. In some examples, the DCI may include information for each hierarchical layer. In other examples, subframes of different subframe types may include DCI for different hierarchical layers. A DCI can be UE-specific (dedicated) or cell-specific (common) and placed in different dedicated and common search spaces within the PDCCH depending on the format of the DCI.

Figure 4:
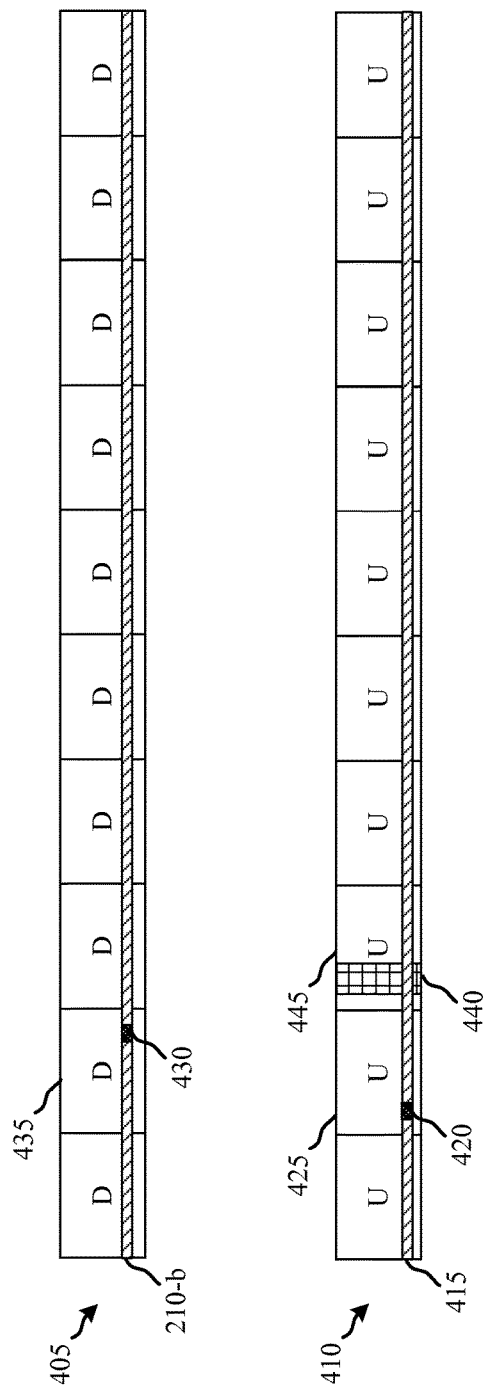
FIG. 4 is a diagram conceptually illustrating an example of uplink and downlink radio frames and transmissions of a trigger, acknowledgment, and data in a wireless communication system, in accordance with aspects of the present disclosure.

As mentioned above, a UE may also initiate low latency mode communications according to various examples. FIG. 4 is a diagram 400 conceptually illustrating an example of a radio frames and initiation of low latency mode communications in a wireless communication system, in accordance with aspects of the present disclosure. The radio frames of FIG. 4 may be transmitted using portions of the wireless communications system 100 described with reference to FIG. 1 between one or more access points 105 and one or more UEs 115, for example. In this example, similarly as described with respect to FIG. 2, a FDD downlink frame 405 may include ten 1 ms subframes. A FDD uplink frame 410 also includes ten 1 ms subframes. The radio frames 405 and 410 may include a subframe structure as discussed above with respect to FIG. 3, including 14 symbols within each 1 ms subframe for legacy LTE communications. Furthermore, similarly as discussed above, subframes may have a second subframe type for wideband fast communications, in which symbol duration for subframes of the second subframe type is shorter than legacy LTE symbol duration.

In the example of FIG. 4, downlink frame 405 may include dedicated FDM resource 210-b that may be monitored by the UE to trigger initiation of low latency mode communications. Furthermore, uplink frame 410 may include a dedicated FDM resource 415 that a UE may use to trigger low latency mode communications. The dedicated FDM resource 415 may be continuously available for monitoring by a UE, for example. In some examples, a UE may transmit a UE request 420 to request a low latency communications. The UE request 420 may be transmitted, for example, in subframe 425, and may be received at the base station which may monitor dedicated FDM resource 415 and transmit an assignment 430 of resources for wideband fast communications. In this example, assignment 430 is transmitted in subframe 445, and assigns wideband fast communications resources 440 that the UE may use to transmit data to the base station. Similarly as discussed above, the base station may allocate dedicated resources FDM 415 for such mobile originated (MO) fast communications triggers. In the event that more than one UE requests access to uplink resources, contention for the uplink channel may be resolved using contention resolution resources similar to random access channel (RACH) resources in legacy LTE. In some examples, a three message contention resolution procedure may be used, in which a first message from a UE (e.g., request 420) indicates who is requesting the resources, a second message from a base station (e.g., assignment 430) may provide an assignment of resources, and a third message (e.g., wideband fast communications resources 440) may include data transmission.

In some examples, the content of the trigger may be in the form of a UE request. The content may include an identification of the UE and traffic information, which may include delay and bandwidth desired for the wideband fast communications resources 440. Access may be provided to a number of UEs, and the dedicated FDM resource 415 may be allocated for different UEs in a similar manner as discussed above for UEs monitoring for downlink triggers, or mobile terminated (MT) triggers. If a relatively large number of UEs are present, orthogonal resources for each UE in the dedicated FDM resource 415 may not be possible, and beacon tones may be assigned to different groups of UEs, for example. In some examples, the dedicated FDM resource 415 may support overlapping multiple access similar to CDMA using an assignment scheme such as used in PUCCH format 3 or overloaded PUSCH as known in legacy LTE.

Figure 5:
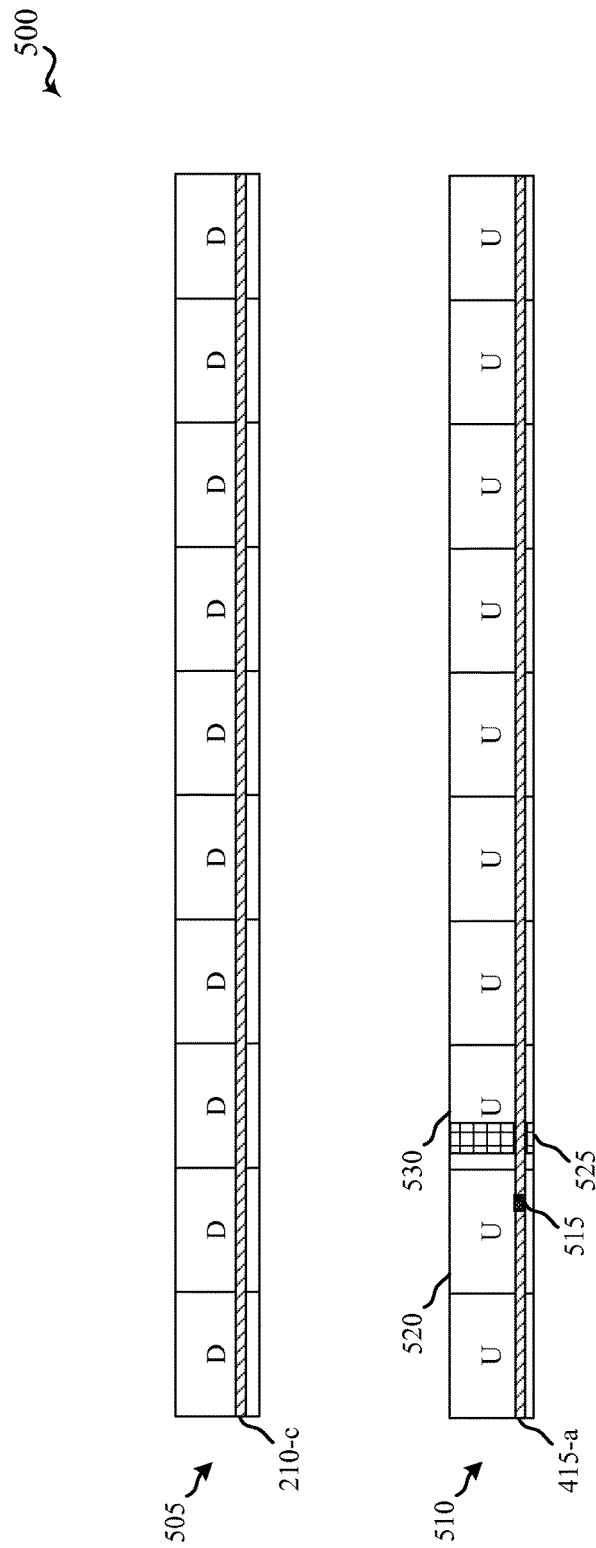
FIG. 5 is a diagram conceptually illustrating another example of uplink and downlink radio frames and transmissions of a trigger and data in a wireless communication system, in accordance with aspects of the present disclosure.

While the example of FIG. 4 provides for relatively low latency in triggering communications, in some cases it may be desirable to further reduce latency between a UE request and transmission of data by the UE. In some examples, latency in initiating communications from a UE may be further reduced through autonomous transmission by the UE. FIG. 5 is a diagram 500 conceptually illustrating an example of a radio frames and initiation of low latency mode communications in a wireless communication system, in accordance with aspects of the present disclosure. The radio frames of FIG. 5 may be transmitted using portions of the wireless communications system 100 described with reference to FIG. 1 between one or more access points 105 and one or more UEs 115, for example. In this example, similarly as described with respect to FIG. 4, a FDD downlink frame 505 may include ten 1 ms subframes. A FDD uplink frame 510 also includes ten 1 ms subframes. The radio frames 505 and 510 may include a subframe structure as discussed above with respect to FIG. 3, including 14 symbols within each 1 ms subframe for legacy LTE communications. Furthermore, similarly as discussed above, subframes may have a second subframe type for wideband fast communications, in which symbol duration for subframes of the second subframe type is shorter than legacy LTE symbol duration.

In the example of FIG. 5, downlink frame 505 may include dedicated FDM resource 210-*c* that may be monitored by the UE to trigger initiation of low latency mode communications. Likewise, uplink frame 510 may include a dedicated FDM resource 415-*a* that a UE may use to trigger low latency mode communications. In this example, UE may transmit a UE request 515 to request a low latency communications. The request may include information similarly as described with respect to request 420 of FIG. 4, and may also indicate that the UE will autonomously begin transmissions. The UE request 515 may be transmitted, for example, in subframe 520, and may be received at the base station which may monitor dedicated FDM resource 415-*a*. In this example, UE autonomously initiates communications using wideband fast communications resources 525 in subframe 530.

Due to the autonomous transmission using wideband fast communications resources 525, some examples provide techniques for a possible collision with communications from other UEs. According to some examples, if it is determined that a collision likely occurred in the transmission using wideband fast communications resources 525, the UE may attempt to retransmit the trigger and the data, or may fall back to a procedure such as in FIG. 4 to resolve contention for uplink resources. In some examples, a base station may determine that a collision has occurred based on trigger requests received from multiple UEs, and may resolve contention between the UEs by assigning resources to each of the UEs.

Figure 6:
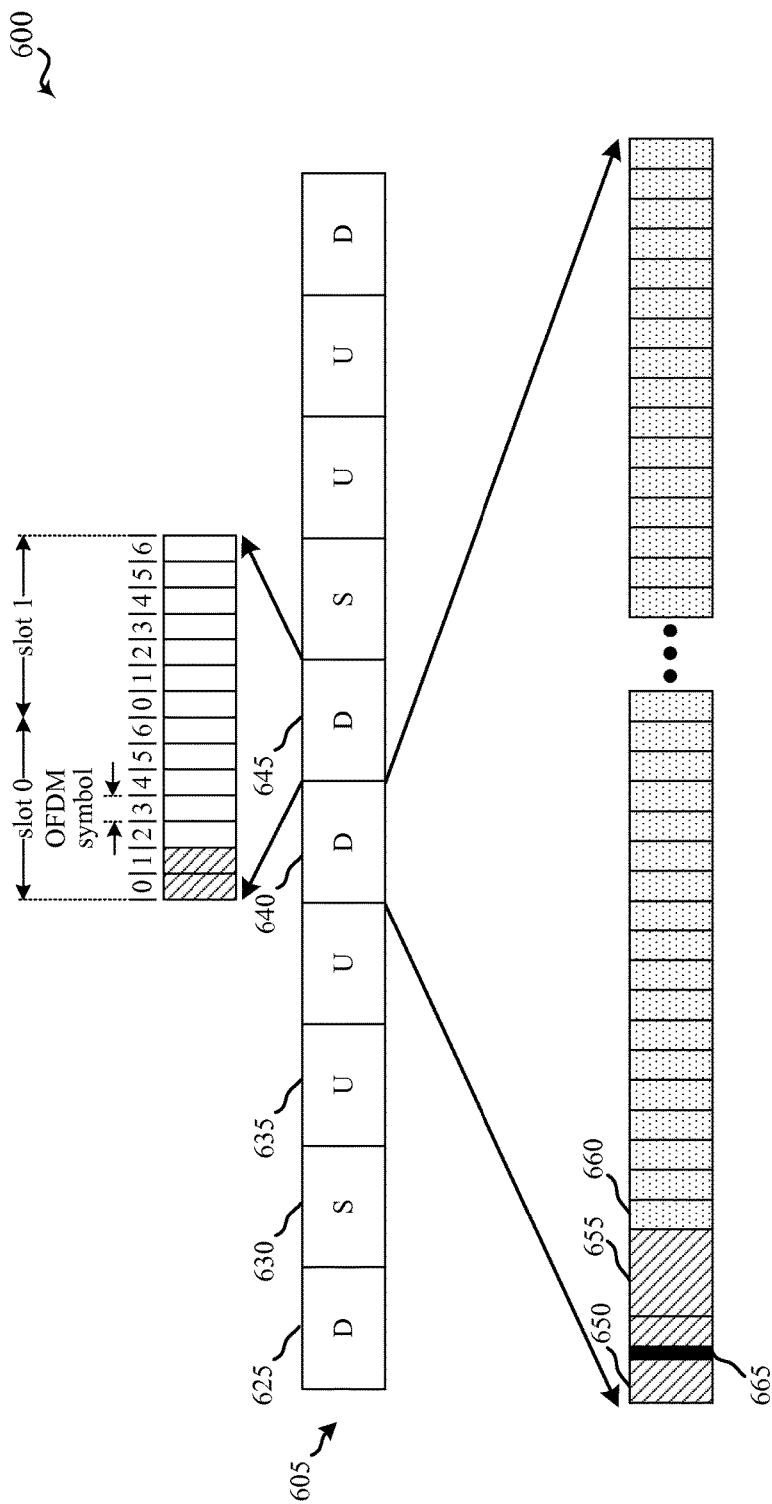
FIG. 6 is a diagram conceptually illustrating an example of a radio frame and trigger resources in TDD subframes in a wireless communication system, in accordance with aspects of the present disclosure.

While the examples discussed with reference to FIGS. 2 through 5 describe low latency mode communications with respect to FDD communications, such low latency mode communications may also be initiated using TDD transmissions according to some examples. FIG. 6 is a diagram 600 conceptually illustrating an example of radio frames and initiation of low latency mode communications in a TDD wireless communication system, in accordance with aspects of the present disclosure. The radio frame of FIG. 6 may be transmitted using portions of the wireless communications system 100 described with reference to FIG. 1 between one or more access points 105 and one or more UEs 115, for example. In this example, frame 605 may include ten 1 ms subframes, which may include downlink subframes 625, uplink subframes 635, and special subframes 630. The downlink subframes 625 transmitted using legacy LTE may include a subframe structure as discussed above with respect to FIG. 3, including 14 symbols within each 1 ms subframe, and uplink subframes may include similar structure transmitted using SC-FDMA. In this example, one or more low latency mode subframes, such as downlink subframe 640 may have a different subframe type as compared to legacy LTE subframes, and include more than 14 symbols.

In the example of FIG. 6, a low latency mode may be initiated based on a trigger that is provided in a dedicated trigger resource. In some examples, the first two symbols 650 and 655 of a subframe may include a trigger 665 that may initiate low latency mode communications for the subframe. In other examples, different symbols or different numbers of symbols may provide the dedicated trigger resource. For example, trigger 665 may be used to indicate to a UE that the downlink subframe 640 is a low latency mode subframe that includes symbols 660 having a shorter duration than legacy LTE symbols 650 and 655. In some examples, the first two symbols of each subframe are transmitted according to legacy LTE techniques in order to provide compatibility with other control information that is transmitted using these symbols. In the event that the first two symbols do not include a trigger, the remainder of the subframe may be transmitted according to legacy LTE techniques, such as illustrated for subframe 645.

In a similar manner, a UE may initiate uplink low latency mode transmissions to a base station by transmitting a trigger in one or the first two symbols of an uplink subframe, and transmitting the remainder of the subframe according to low latency mode transmissions. In the event that a base station transmits a trigger for low latency mode, legacy UEs that are not configured to operate according to low latency mode may be signaled that the subframe contains a Multimedia Broadcast Single Frequency Network (MBSFN) transmission, or that the subframe is an uplink subframe. Thus, the trigger occurs at the beginning of each subframe, and the resulting worst case delay between determining that fast communications mode is to be entered and transmitting the trigger is about one millisecond. In some examples, UEs may be split into two groups, and each group of UEs has one symbol time to decode. In the event that the trigger is contained in the second symbol and wideband fast communications symbols are immediately transmitted after the trigger, the UE may need to buffer the entire wideband signal before it decodes the trigger.

Figure 7:
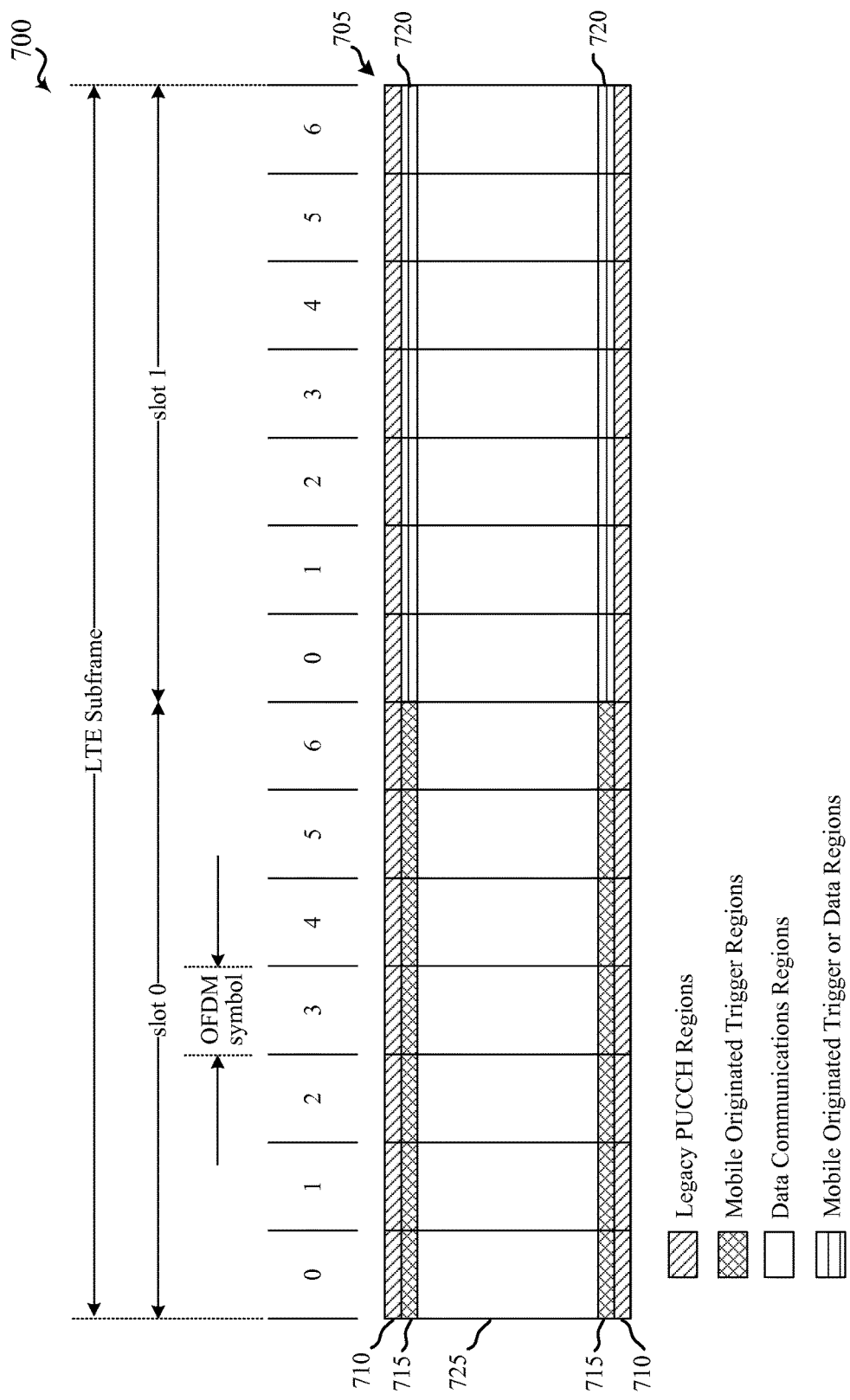
FIG. 7 is a diagram illustrating an example of a frame structure with trigger and transmission resources that may be used in a wireless communication system, in accordance with aspects of the present disclosure.

With reference now to FIG. 7 a block diagram 700 conceptually illustrating another example of a radio frame and triggering of low latency mode communications is described in accordance with aspects of the present disclosure. The radio frame of FIG. 7 may be transmitted using portions of the wireless communications system 100 described with reference to FIG. 1 between one or more access points 105 and one or more UEs 115, for example. In this example, similarly as described above, a legacy LTE frame 710 may include ten 1 ms downlink subframes, which may include a subframe structure as discussed above with respect to FIG. 3, including 14 symbols within each 1 ms subframe.

In the example of FIG. 7, each subframe includes legacy PUCCH regions 710. Dedicated resources 715 may be provided for UE triggers, also referred to as mobile originated (MO) triggers. The dedicated resources 715 may be multiplexed across UEs, in some examples. The multiplexing may be code division multiplexing, time division multiplexing, or frequency division multiplexing. The dedicated resources 715, in this example, are provided in the first slot of subframe 705. These same resources in the second slot may be used as flex resources 720, and may be used to transmit either a UE trigger or data. For example, if a UE needs to transmit a relatively small amount of data, a trigger may be transmitted using dedicated resources 715, followed by a data transmission using flex resources 720. The subframe 705 also includes data communication regions 725, which may be used for legacy data communications or low latency communications.

In certain examples, the trigger transmitted in dedicated resources 715, or in flex resources 720, may initiate low latency mode communications in a subsequent subframe, in which data transmitted in data communication regions 725 may be transmitted using subframe types that have shorter duration symbols. Thus, if a relatively large amount of data needs to be transmitted, a trigger may include information indicating that a subsequent subframe should be a low latency mode subframe, while if only a small amount of data is to be transmitted, the flex resources 720 may be employed. In the event of a collision of packets from different UEs using flex resources 720, a UE may retransmit or may initiate a trigger to request assigned resources from data communication regions 725.

Figure 8A:
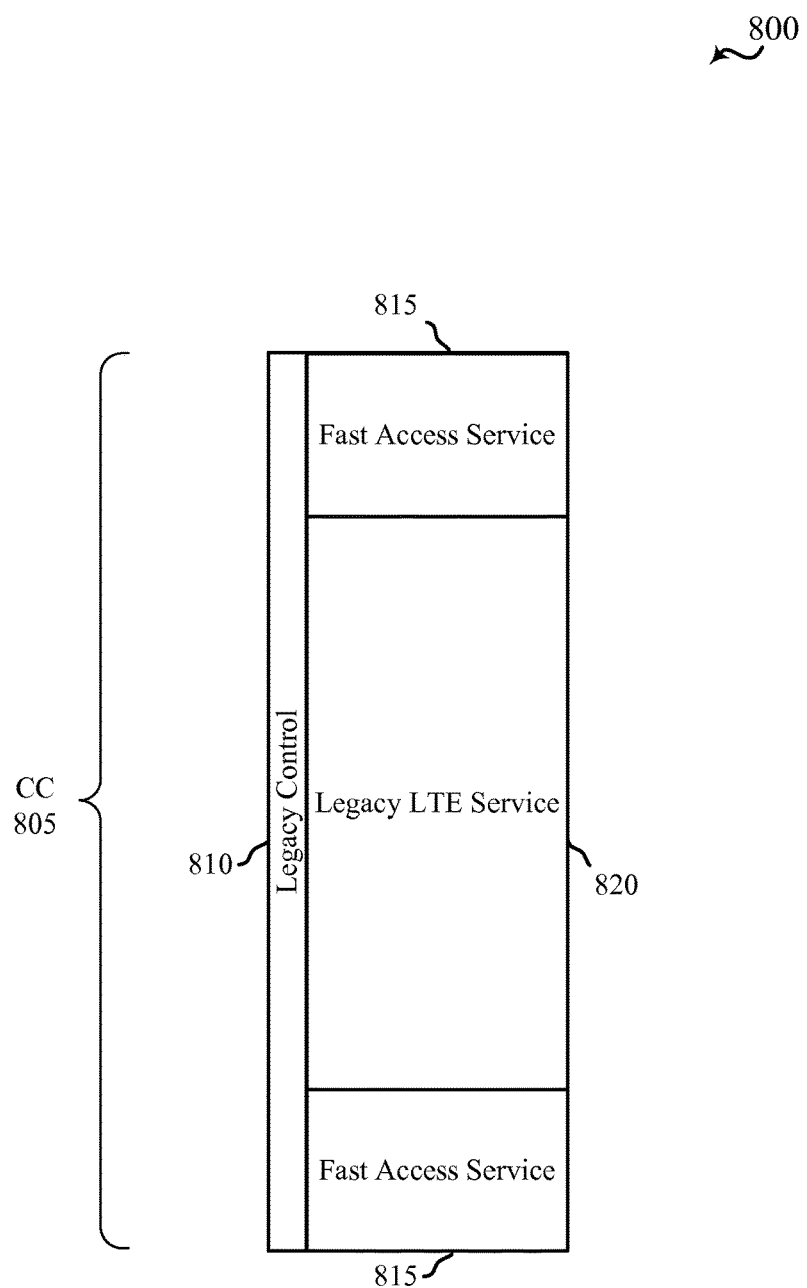
FIG. 8A is a diagram illustrating an example of resource partitioning that may be used in a wireless communication system, in accordance with aspects of the present disclosure.
Figure 8B:
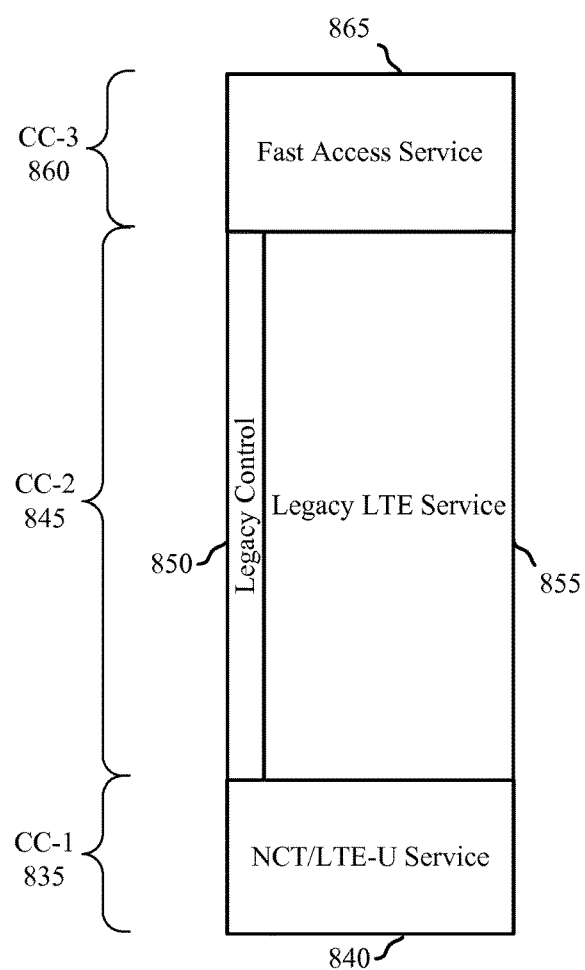
FIG. 8B is a diagram illustrating another example of resource partitioning that may be used in a wireless communication system, in accordance with aspects of the present disclosure.
Figure 8C:
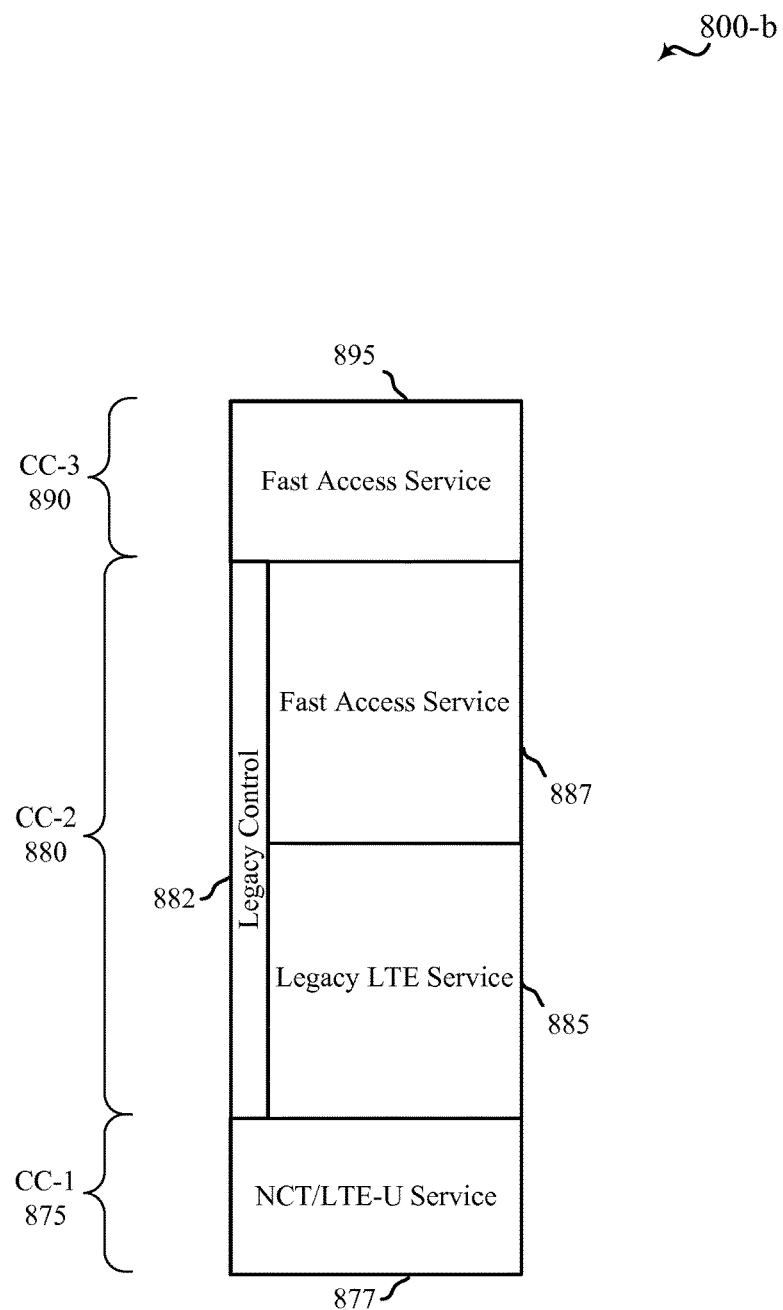
FIG. 8C is a diagram illustrating another example of resource partitioning that may be used in a wireless communication system, in accordance with aspects of the present disclosure.

With reference now to FIGS. 8A-8C block diagrams 800 are described that conceptually illustrate examples of legacy communications and low latency communications using different resources of a wireless communication system, in accordance with aspects of the present disclosure. The communications of FIGS. 8A-8C may be transmitted using portions of the wireless communications system 100 described with reference to FIG. 1 between one or more access points or eNBs 105 and one or more UEs 115, for example. In the example of FIG. 8A, resources 800 may include a single component carrier 805 that may include a legacy control region 810, fast access service regions 815, and legacy LTE service region 820. Such a configuration may be used with either FDM or TDM communications within component carrier 805. Legacy control region 810 may include, in certain examples, the first two symbols of subframes, which may include various legacy control and signaling information.

In the example of FIG. 8B, resources 800-a may include multiple component carriers that may be utilized to provide different access modes, and may be implemented in systems operating using FDM with carrier aggregation, for example. In this example, a first component carrier CC-1 835 may provide new carrier type (NCT) service or LTE service using unlicensed spectrum (LTE-U) 840. A second component carrier CC-2 845 may provide legacy LTE service, including LTE control region 850 and legacy LTE service region 855. A third component carrier CC-3 860 may provide fast access service 865 using low latency mode communications such as described above.

In the example of FIG. 8C, resources 800-b may include multiple component carriers that may be utilized to provide different access modes with dynamic sharing of access modes on certain component carriers, and may be implemented in systems operating using FDM with carrier aggregation, for example. In this example, a first component carrier CC-1 875 may provide new carrier type (NCT) service or LTE service using unlicensed spectrum (LTE-U) 877. A second component carrier CC-2 880 may provide legacy LTE control region 882 and dynamic sharing between legacy LTE service 885 and fast access service 887, in a manner similar as discussed above with reference to FIGS. 2-6. A third component carrier CC-3 890 may provide fast access service 895 using low latency mode communications such as described above. In still further examples, stand-alone communications using low latency mode may be provided, which may have shorter cyclic prefixes, shorter symbol duration, different FFT size, and smaller transport block size, relative to legacy LTE, for example.

Figure 9A:
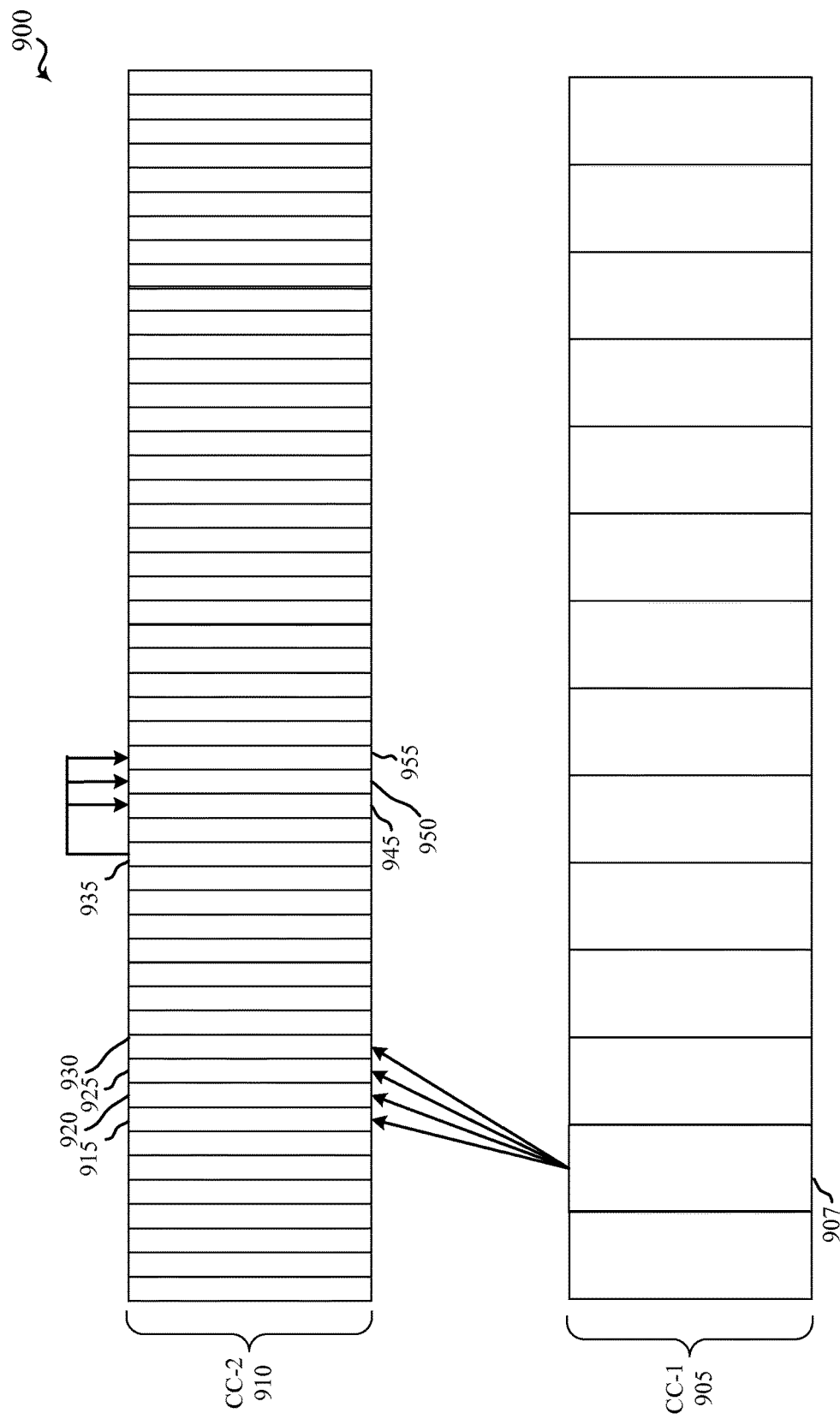
FIG. 9A is a diagram conceptually illustrating another example of radio frames for different component carriers and resource scheduling that may transmitted on different component carriers of a wireless communication system, in accordance with aspects of the present disclosure.

As mentioned with reference to FIG. 8, in some examples a component carrier may be configured to provide low latency mode network access. FIG. 9A is a diagram 900 conceptually illustrating an example of different component carriers configured to provide legacy and low latency mode access, in accordance with aspects of the present disclosure. The component carriers of FIG. 9A may be transmitted using portions of the wireless communications system 100 described with reference to FIG. 1 between one or more access points 105 and one or more UEs 115, for example. In this example, similarly as described with respect to FIG. 8, a first component carrier CC-1 905 may carry legacy LTE communications, or may dynamically share legacy LTE and low latency mode communications. A second component carrier CC-2 910 may be configured for low latency mode communications, and may include subframes exclusively of the type that include additional symbols relative to legacy LTE subframes.

In some examples, CC-1 905 may be configured as the primary cell (PCell) and may handle camping, mobility, and related tasks for a UE. CC-2 910 may be configured as a secondary cell (SCell). In some example resource assignments may be communicated using the PCell, namely CC-1 905, and a number of different resources for the SCell using CC-2 910 may be assigned using a single PCell resource on CC-1 905. In the example of FIG. 9A, symbol 907 may include resource assignments for a UE that correspond to symbols 915, 920, 925, and 930 on CC-2 910. Thus, there may be a 1-to-N mapping for such assignments, and a delay between triggering of resources at CC-1 905 to the transmissions on CC-2 910 may be on the order of one OFDM symbol. Additionally, in some examples, SCell transmissions on CC-2 910 may be self-assigned. For example, in symbol 935 may include an assignment for symbols 945, 950, and 955. Such self-assignments may, as indicated in FIG. 9A, also include 1-to-N mapping, and may provide delays that are shorter than the duration of a legacy OFDM symbol. The assignments discussed above may be for MO or MT communications, and may provide assignments for both uplink and downlink communications that employ such component carriers.

When multiple component carriers are configured, acknowledgment of receipt of transmissions, such as an acknowledgment/negative acknowledgment (ACK/NACK) according to a HARQ scheme, may be transmitted from the PCell for the SCell. FIG. 9B is a diagram 900-*a* conceptually illustrating an example of different component carriers configured to provide acknowledgment of receipt of transmissions for component carriers configured to provide legacy and low latency mode access, in accordance with aspects of the present disclosure. The component carriers of FIG. 9B may be transmitted using portions of the wireless communications system 100 described with reference to FIG. 1 between one or more access points 105 and one or more UEs 115, for example. In this example, similarly as described with respect to FIG. 9A, a first component carrier CC-1 960 may carry legacy LTE communications, or may dynamically share legacy LTE and low latency mode communications. A second component carrier CC-2 965 may be configured for low latency mode communications, and may include subframes exclusively of the type that include additional symbols relative to legacy LTE subframes.

In some examples, CC-1 960 may be configured as the primary cell (PCell) and may handle camping, mobility, and related tasks for a UE. CC-2 965 may be configured as a secondary cell (SCell). In legacy LTE, the PCell (e.g., CC-1 960) may transmit ACK/NACK for the SCell with one-to-one mapping between the PCell resource and the associated SCell resource. In some examples, such as illustrated in FIG. 9B, acknowledgments of transmissions for the SCell may be communicated using the PCell, namely CC-1 960, with an acknowledgment for a number of different resources of CC-s 965 for the SCell acknowledged using a single PCell resource on CC-1 960. In the example of FIG. 9B, symbol 985 may provide acknowledgment (or negative acknowledgment) for SCell resources that correspond to symbols 970, 975, and 980 on CC-2 965. Thus, there may be a 1-to-M mapping for such acknowledgments from the PCell for the SCell. The acknowledgments of transmissions discussed above may be for MO or MT communications, and may provide acknowledgments for both uplink and downlink communications that employ such component carriers.

Figure 10A:
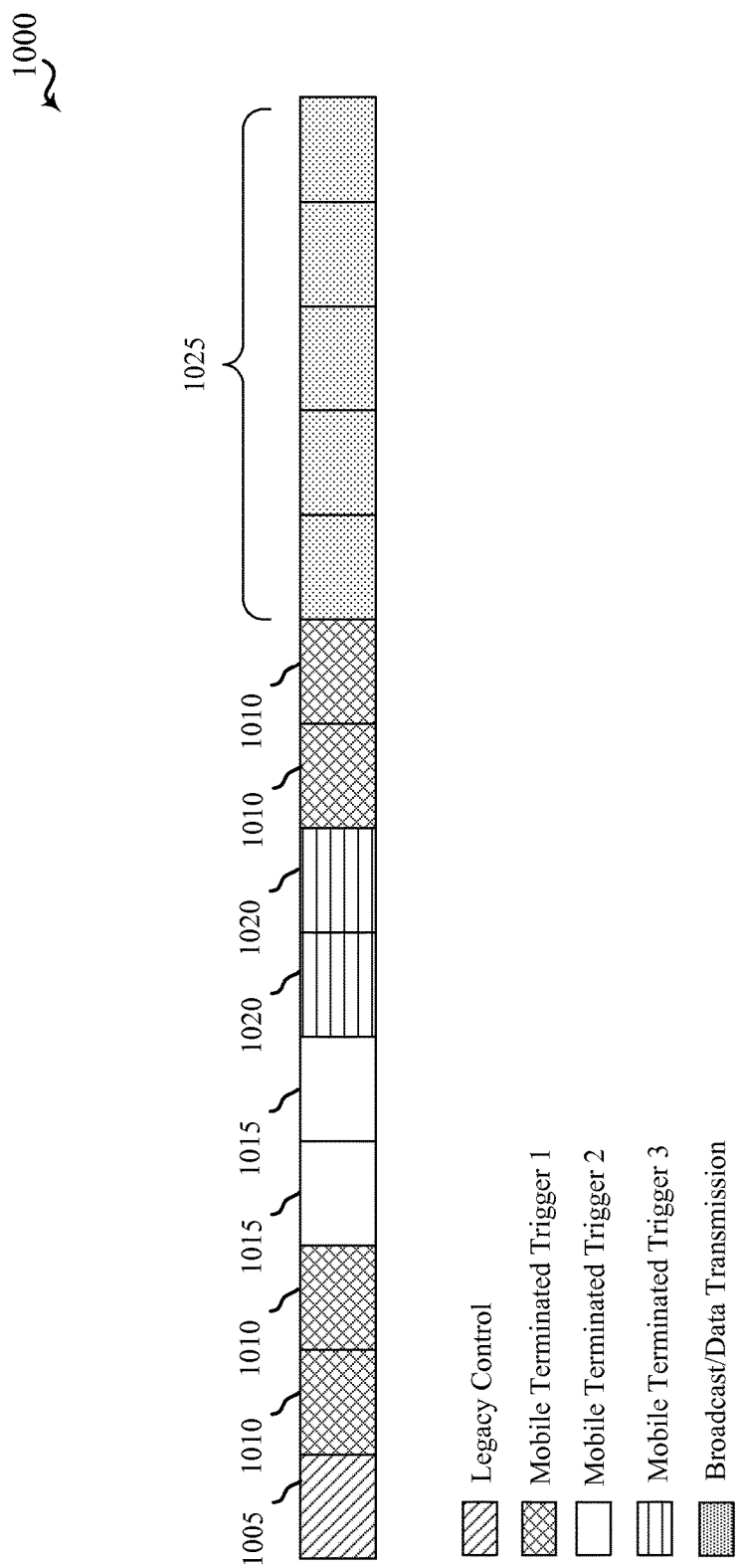
FIG. 10A is a diagram conceptually illustrating an example of a radio frame and dedicated trigger resource with time division multiplexed resources for different devices in a wireless communication system, in accordance with aspects of the present disclosure.
Figure 10B:
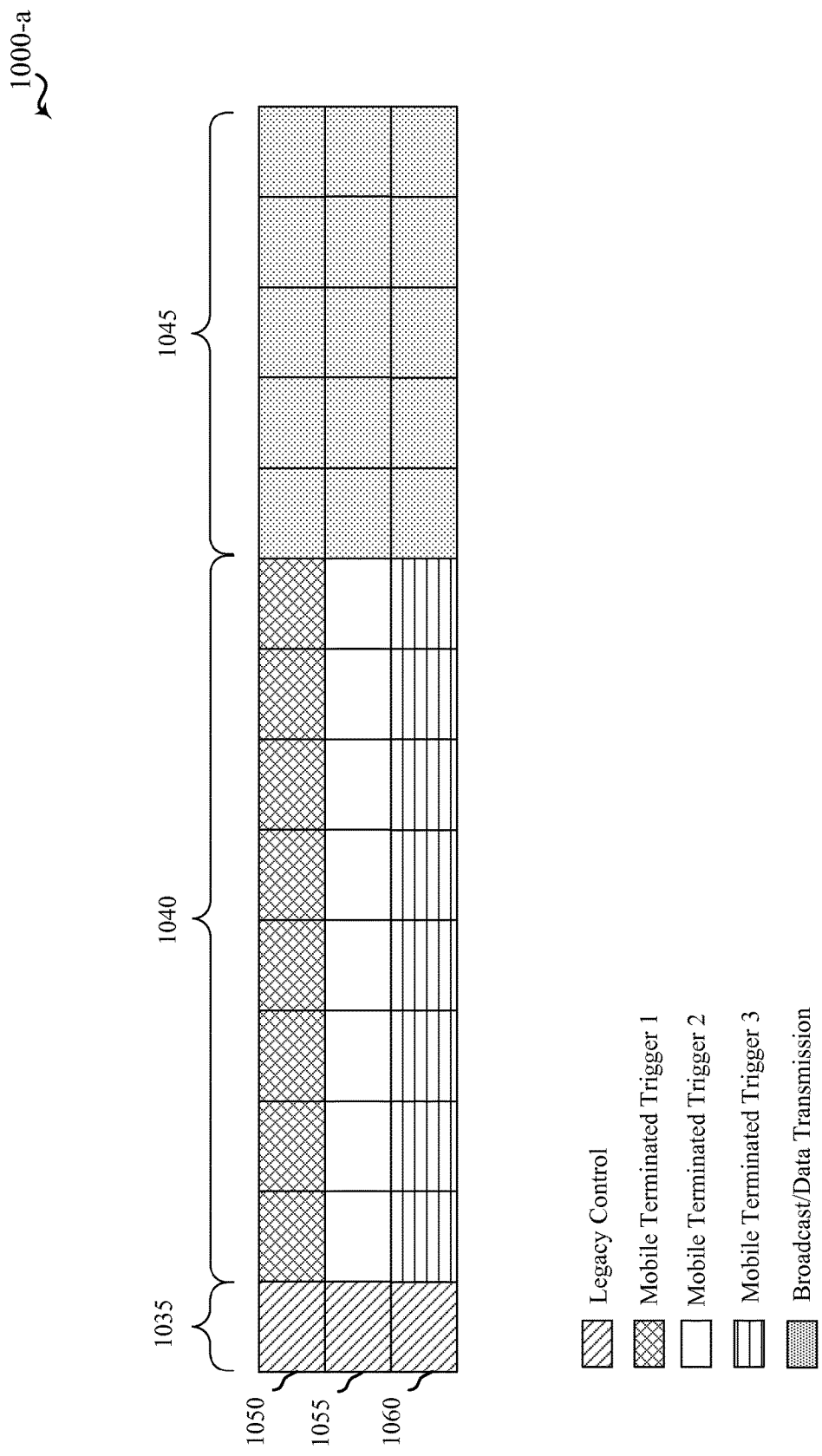
FIG. 10B is a diagram conceptually illustrating another example of a radio frame and dedicated trigger resource with frequency division multiplexed resources for different devices in a wireless communication system, in accordance with aspects of the present disclosure.
Figure 10C:
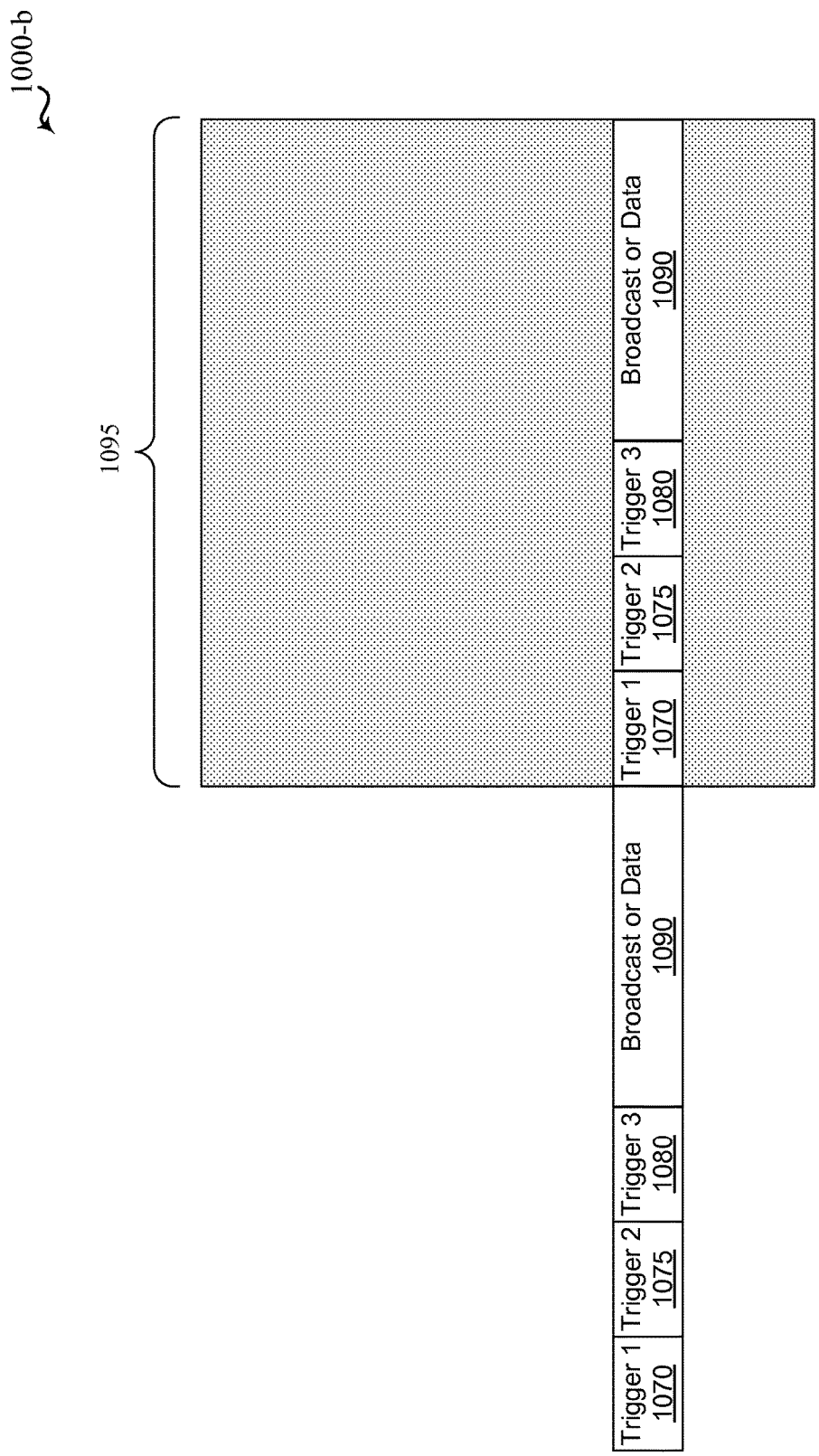
FIG. 10C is a diagram conceptually illustrating an example of a radio frame and dedicated trigger resource with communications initiated in the subframe immediately following the trigger subframe, in accordance with aspects of the present disclosure.

With reference now to FIGS. 10A-10C diagrams 1000 are described that conceptually illustrate examples for transmitting a trigger for low latency communications mode to a UE, in accordance with aspects of the present disclosure. The communications of FIGS. 10A-10C may be transmitted using portions of the wireless communications system 100 described with reference to FIG. 1 between one or more access points or eNBs 105 and one or more UEs 115, for example. In the example of FIG. 10A, resources may be configured in a manner similar to a legacy LTE PDCCH, in which different symbols may be used to transmit various information related to low latency mode triggering. In this example, symbol 1005 may be a legacy LTE control symbol and certain of the remaining symbols may also contain legacy information such as PSS/SSS/PBCH if they are located in the center 6 resource blocks of a subframe, and dedicated pilots may follow a legacy LTE CRS structure. Triggers for different UEs may be multiplexed in other symbols in TDM, in order to signal to a particular UE, or a UE of a group of UEs, to switch to low latency mode. In the example of FIG. 10A, symbols 1010 may be mapped to a first UE or a first group of UEs, which may monitor these symbols for a trigger signal. Symbols 1015 may be mapped to a second UE or a second group of UEs, and symbols 1020 may be mapped to a third UE or a third group of UEs. Finally, symbols 1025 may be used to carry other information, such as broadcast information or short data transmissions.

In the example of FIG. 10B, resources may be configured in a manner similar to a legacy LTE ePDCCH, and may provide resource block granularity, and may also introduce an additional demodulation reference signal (DMRS) for demodulation. In this example, FDM may be used to channelize information related to low latency mode triggering. In this example, symbol 1035 may be a legacy LTE control symbol and certain of the remaining symbols may also contain legacy information such as PSS/SSS/PBCH if they are located in the center 6 resource blocks of a subframe, and dedicated pilots may follow a legacy LTE CRS structure. Triggers 1040 for different UEs may be frequency division multiplexed, in order to signal to a particular UE, or a UE of a group of UEs, to switch to low latency mode. In the example of FIG. 10B, frequency resources 1050 may be mapped to a first UE or a first group of UEs, which may monitor these resources for a trigger signal. Frequency resources 1055 may be mapped to a second UE or a second group of UEs, and frequency resources 1060 may be mapped to a third UE or a third group of UEs. Finally, symbols 1045 may be used to carry other information, such as broadcast information or short data transmissions.

In the example of FIG. 10C, a trigger may initiate a low latency communications transmission in a subsequent subframe. In this example, triggers may be time division multiplexed, and in this example trigger 1 1070, trigger 2 1075, and trigger 3 1080 may be multiplexed in a first set of symbols of a subframe, with broadcast or data communications 1090 included in later symbols, similarly as discussed above. The trigger signal 1070, 1075, or 1080 conveys configurations for low latency mode communications, such as bandwidth information and communications duration for a wideband fast communication 1095 of the following subframe. Thus, a delay between a trigger and initiation of communications, in this example, would be less than the duration of a subframe.

Figure 11A:
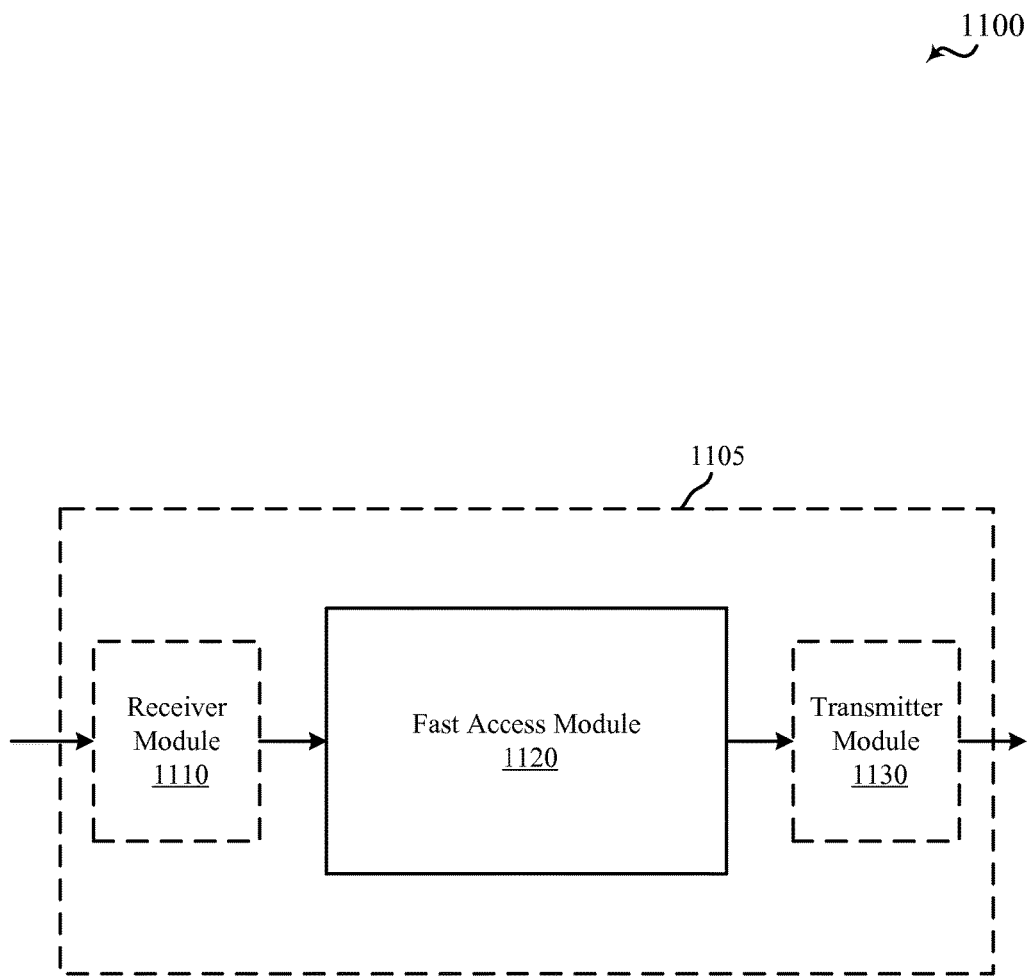
FIGS. 11A and 11B are block diagrams conceptually illustrating devices, such as eNBs or UEs, for use in wireless communications in accordance with aspects of the present disclosure.
Figure 11B:
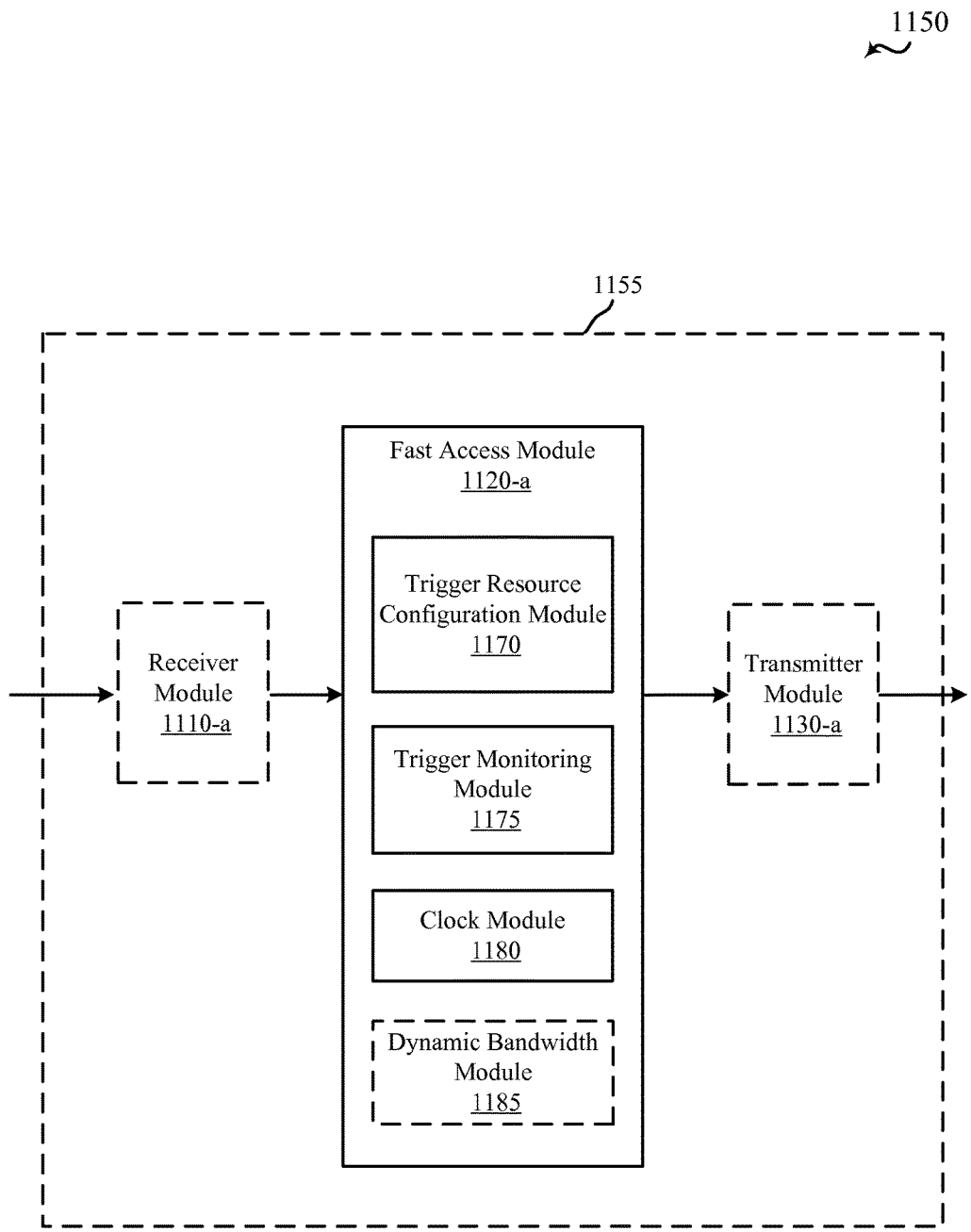

FIGS. 11A and 11B are block diagrams conceptually illustrating devices, such as eNBs or UEs, for use in wireless communications in accordance with aspects of the present disclosure. With reference first to FIG. 11A, a block diagram 1100 illustrates a device 1105 for use in wireless communications in accordance with various examples. In some examples, the device 1105 may be an example of one or more aspects of the base stations or eNBs 105 or UEs 115 described with reference to FIG. 1. The device 1105 may also be a processor. The device 1105 may include a receiver module 1110, a fast access module 1120, or a transmitter module 1130. Each of these components may be in communication with each other.

The components of the device 1105 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive transmissions on two or more hierarchical layers (e.g., through legacy LTE subframes and burst mode subframes). The receiver module 1110 may be used to receive various types of data or control signals (i.e., transmissions) over one or more communication links of a wireless communications system, such as one or more communication links 125 of the wireless communications system 100 described with reference to FIG. 1.

In some examples, the transmitter module 1130 may be or include an RF transmitter, such as an RF transmitter operable to transmit on two or more hierarchical layers (e.g., through legacy LTE subframes and burst mode subframes). The transmitter module 1130 may be used to transmit various types of data or control signals (i.e., transmissions) over one or more communication links of a wireless communications system, such as one or more communication links 125 of the wireless communications system 100 described with reference to FIG. 1.

In some examples, the fast access module 1120 may configure trigger resources or monitoring of trigger resources for device 1105 operation in a wireless communications system having two or more latency modes. Fast access module 1120 may, for example configure device 1105 to operate within the wireless communications system and to switch to a low latency communications mode. Configuration and operation may include transmission or reception of legacy or low latency mode subframes, such as described above with respect to FIGS. 1-10, for example.

Referring now to FIG. 11B, a block diagram 1150 illustrates a device 1155 for use in wireless communications, in accordance with various aspects of the present disclosure. In some examples, the device 1155 may be an example of one or more aspects of the base stations or eNBs 105, UEs 115, or device 1105 described with reference to FIG. 1, or 11A. The device 1155 may also be a processor. The device 1155 may include a receiver module 1110, a fast access module 1120-*a*, or a transmitter module 1130. Each of these components may be in communication with each other.

The components of the device 1155 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110-*a* may be an example of the receiver module 1110 of FIG. 11A. The receiver module 1110-*a* may be or include a radio frequency (RF) receiver, such as an RF receiver operable to receive transmissions on two or more latency modes (e.g., through legacy LTE subframes and low latency mode subframes). The RF receiver, in some examples, may include separate receivers for the first and second hierarchical layers. In other examples, the RF receiver may include a single receiver, or a single receiver per transmit/receive chain, and a clock module 1180 of fast access module 1120-*a* may be adapted to process received symbols having different symbol durations. The receiver module 1110-*a* may be used to receive various types of data or control signals (i.e., transmissions) over one or more communication links of a wireless communications system, such as one or more communication links 125 of the wireless communications system 100 described with reference to FIG. 1.

In some examples, the transmitter module 1130-*a* may be an example of the transmitter module 1130 of FIG. 11A. The transmitter module 1130-*a* may be or include a radio frequency (RF) transmitter, such as an RF transmitter operable to transmit on two or more latency modes (e.g., through legacy LTE subframes and low latency mode subframes). The RF transmitter 1130-*a*, in some examples, may include a single transmitter, or a single transmitter per transmit/receive chain, and a clock module 1180 of fast access module 1120-*a* may be adapted to generate symbols having different symbol durations. The transmitter module 1130-*a* may be used to receive various types of data or control signals (i.e., transmissions) over one or more communication links of a wireless communications system including over two or more hierarchical layers, such as one or more communication links 125 of the wireless communications system 100 described with reference to FIG. 1.

The fast access module 1120-*a* may be an example of the fast access module 1120 described with reference to FIG. 11A and may include a trigger resource configuration module 1170, a trigger monitoring module 1175, clock module 1180, and optional dynamic bandwidth module 1185. Each of these components may be in communication with each other.

In some examples, the trigger resource configuration module 1170 may perform configuration of a trigger resource, such as a dedicated FDM resource, for the device 1155, such as described above with respect to FIGS. 1-10, for example. The trigger monitoring module 1175 may configure for the device 1155 to monitor for triggers to enter a low latency mode, such as described above with respect to FIGS. 1-10, for example. The clock module 1180 may perform clock adaptation to allow a clock to be adapted in order to enable generation of symbols, and processing of received symbols, having different symbol durations, such as described above with respect to FIGS. 1-10, for example. Optional dynamic bandwidth module 1185 may perform bandwidth scaling in examples that may alter bandwidth of a dedicated resource based on the number of UEs, for example, that may need to utilize the resource, such as described above with respect to FIGS. 1-10, for example.

Figure 12:
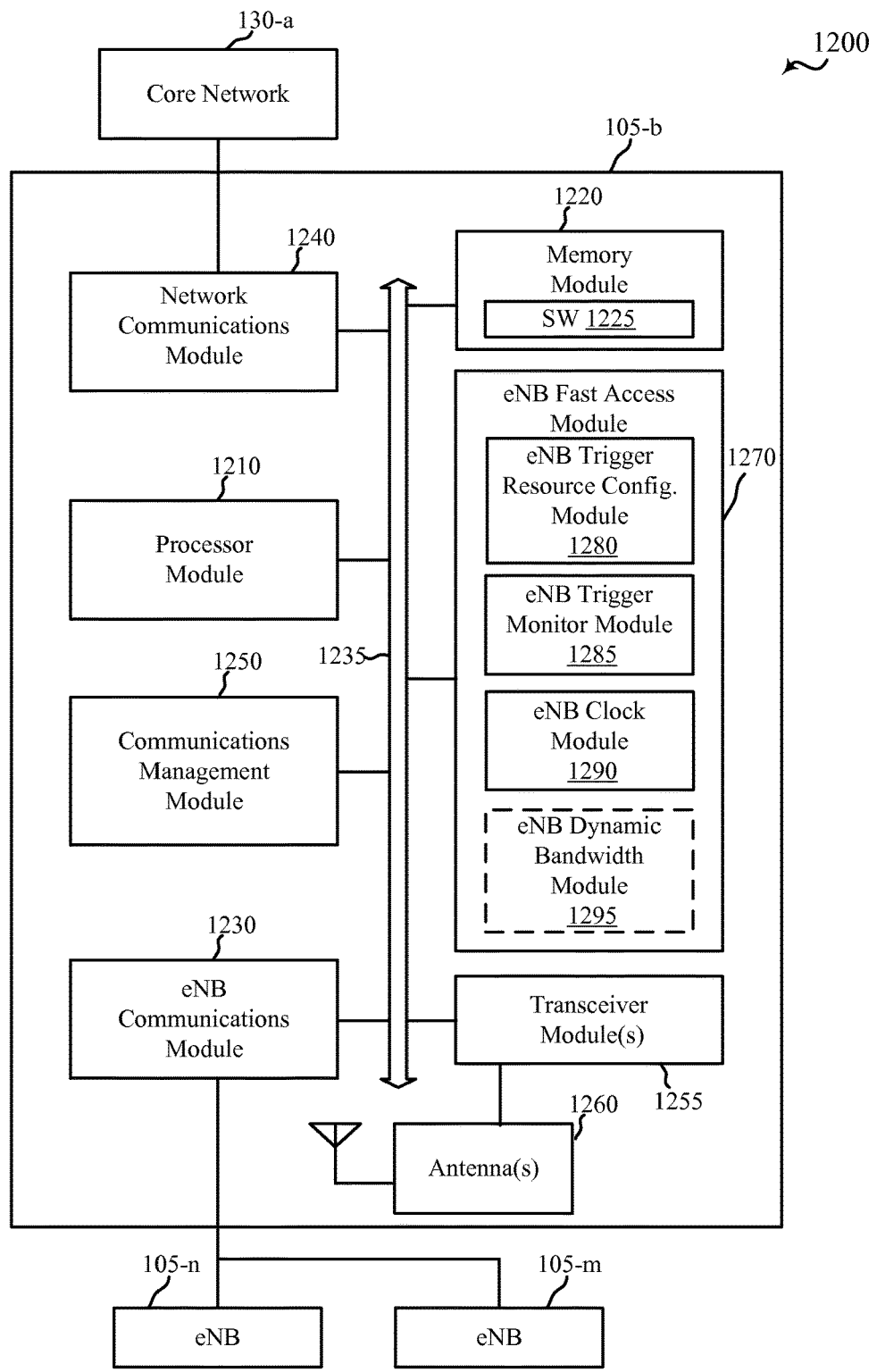
FIG. 12 is a block diagram conceptually illustrating a design of an eNB, in accordance with aspects of the present disclosure.

FIG. 12 is a block diagram 1200 conceptually illustrating a design of an eNB, in accordance with aspects of the present disclosure, configured for low latency communications within a wireless communications system. In examples, the eNB 105-*b* may be an example of one or more aspects of the base stations, eNBs, or devices 105, 1105, or 1155 described with reference to FIG. 1 or 11. The eNB 105-*b* may be configured to implement at least some of the low latency communications features and functions described with respect to FIGS. 1-10. The eNB 105-*b* may include a processor module 1210, a memory module 1220, at least one transceiver module (represented by transceiver module(s) 1255), at least one antenna (represented by antenna(s) 1260), or an eNB fast access module 1270. The eNB 105-*b* may also include one or both of an eNB communications module 1230 and a network communications module 1240. Each of these components may be in communication with each other, directly or indirectly, over one or more buses 1235.

The memory module 1220 may include random access memory (RAM) or read-only memory (ROM). The memory module 1220 may store computer-readable, computer-executable software (SW) code 1225 containing instructions that are configured to, when executed, cause the processor module 1210 to perform various functions described herein for low latency communications in two or more layers, including the transmission or reception of low latency subframes, such as described above. Alternatively, the software code 1225 may not be directly executable by the processor module 1210 but be configured to cause the eNB 105-*b*, e.g., when compiled and executed, to perform various aspects of the functions described herein.

The processor module 1210 may include an intelligent hardware device, e.g., a central processing unit (CPU), a microcontroller, an ASIC, etc. The processor module 1210 may process information received through the transceiver module(s) 1255, the eNB communications module 1230, or the network communications module 1240. The processor module 1210 may also process information to be sent to the transceiver module(s) 1255 for transmission through the antenna(s) 1260, to the eNB communications module 1230 for transmission to one or more other base stations or eNBs 105-*n* and 105-*m*, or to the network communications module 1240 for transmission to a core network 130-*a*, which may be an example of aspects of the core network 130 described with reference to FIG. 1. The processor module 1210 may handle, alone or in connection with the eNB fast access module 1270, various aspects of hierarchical communications in two or more hierarchical layers, such as described above with respect to FIGS. 1-10.

The transceiver module(s) 1255 may include a modem configured to modulate the packets and provide the modulated packets to the antenna(s) 1260 for transmission, and to demodulate packets received from the antenna(s) 1260. The transceiver module(s) 1255 may be implemented as one or more transmitter modules and one or more separate receiver modules. The transceiver module(s) 1255 may support low latency communications (e.g., through legacy LTE subframes and low latency mode subframes). The transceiver module(s) 1255 may be configured to communicate bi-directionally, via the antenna(s) 1260, with one or more of the UEs or devices 115, 1105 or 1155 described with reference to FIG. 1 or 11, for example. The eNB 105-*b* may include multiple antennas 1260 (e.g., an antenna array). The eNB 105-*b* may communicate with the core network 130-*a* through the network communications module 1240. The eNB 105-*b* may communicate with other access points or eNBs, such as the eNB 105-*n* or 105-*m*, using the eNB communications module 1230.

According to the architecture of FIG. 12, the eNB 105-*b* may further include a communications management module 1250. The communications management module 1250 may manage communications with other base stations, eNBs, or devices. The communications management module 1250 may be in communication with some or all of the other components of the eNB 105-*b* via the bus or buses 1235. Alternatively, functionality of the communications management module 1250 may be implemented as a component of the transceiver module(s) 1255, as a computer program product, or as one or more controller elements of the processor module 1210.

The eNB fast access module 1270 may be configured to perform or control some or all of the eNB hierarchical communications functions or aspects described with reference to FIGS. 1-10. For example, the eNB fast access module 1270 may be configured to support low latency communications of a wireless communications system configured for multiple latency transmissions, such as through transmission/reception of low latency mode subframes. The eNB fast access module 1270 may include an eNB trigger resource configuration module 1280 to configure the eNB 105-*b* to provide a trigger resource that may be used to trigger low latency communications, an eNB trigger monitor module 1285 configured to perform functions related to monitoring for transmissions of triggers, eNB clock module 1290 configured to provide clock adaptation based on symbol duration, and optional eNB scalable bandwidth module 1295 configured to perform bandwidth scaling. The eNB fast access module 1270 may be an example of similar modules (e.g., modules 1120) described with reference to FIG. 11A or 11B. The eNB fast access module 1270, or portions of it, may include a processor or some or all of the functionality of the eNB fast access module 1270 may be performed by the processor module 1210 or in connection with the processor module 1210.

Figure 13:
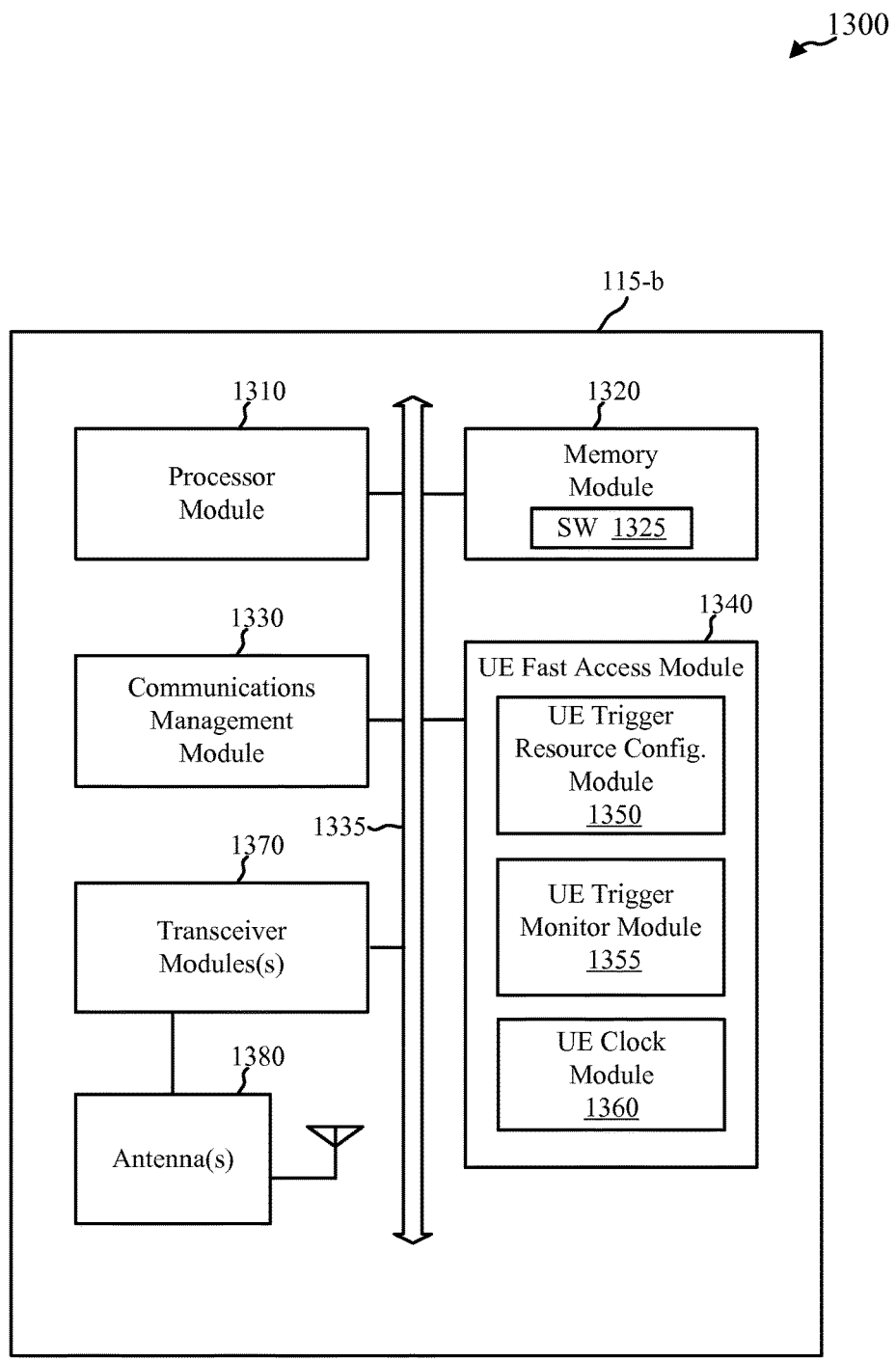
FIG. 13 is a block diagram conceptually illustrating a design of a UE, in accordance with aspects of the present disclosure.

FIG. 13 is a block diagram 1300 conceptually illustrating a design of a UE, in accordance with aspects of the present disclosure, configured for hierarchical communications in a wireless communications system. The UE 115-*b* may have various other configurations and may be included or be part of a personal computer (e.g., laptop computer, netbook computer, tablet computer, etc.), a cellular telephone, a PDA, a digital video recorder (DVR), an internet appliance, a gaming console, an e-reader, etc. The UE 115-*b* may have an internal power supply (not shown), such as a small battery, to facilitate mobile operation. In some examples, the UE 115-*b* may be an example of one or more of the UEs or devices 115, 1105 or 1155 described with reference to FIG. 1, 11A or 11B. The UE 115-*b* may be configured to communicate with one or more of the access points, eNBs or devices 105, 1105 or 1155 described with reference to FIG. 1, 11A, 11B or 12.

The UE 115-*b* may include a processor module 1310, a memory module 1320, at least one transceiver module (represented by transceiver module(s) 1370), at least one antenna (represented by antenna(s) 1380), or a UE fast access module 1340. Each of these components may be in communication with each other, directly or indirectly, over one or more buses 1335.

The memory module 1320 may include RAM or ROM. The memory module 1320 may store computer-readable, computer-executable software (SW) code 1325 containing instructions that are configured to, when executed, cause the processor module 1310 to perform various functions described herein for hierarchical communications in a wireless communication system. Alternatively, the software code 1325 may not be directly executable by the processor module 1310 but be configured to cause the UE 115-*b* (e.g., when compiled and executed) to perform various aspects of the UE functions described herein.

The processor module 1310 may include an intelligent hardware device, e.g., a CPU, a microcontroller, an ASIC, etc. The processor module 1310 may process information received through the transceiver module(s) 1370 or information to be sent to the transceiver module(s) 1370 for transmission through the antenna(s) 1380. The processor module 1310 may handle, alone or in connection with the UE fast access module 1340, various aspects of low latency communications, including transmission and reception of low latency mode subframes, for example.

The transceiver module(s) 1370 may be configured to communicate bi-directionally with eNBs. The transceiver module(s) 1370 may be implemented as one or more transmitter modules and one or more separate receiver modules. The transceiver module(s) 1370 may support low latency communications. The transceiver module(s) 1370 may include a modem configured to modulate the packets and provide the modulated packets to the antenna(s) 1380 for transmission, and to demodulate packets received from the antenna(s) 1380. While the UE 115-*b* may include a single antenna, there may be examples in which the UE 115-*b* may include multiple antennas 1380.

According to the architecture of FIG. 13, the UE 115-*b* may further include a communications management module 1330. The communications management module 1330 may manage communications with various base stations or eNBs. The communications management module 1330 may be a component of the UE 115-*b* in communication with some or all of the other components of the UE 115-*b* over the one or more buses 1335. Alternatively, functionality of the communications management module 1330 may be implemented as a component of the transceiver module(s) 1370, as a computer program product, or as one or more controller elements of the processor module 1310.

The UE fast access module 1340 may be configured to perform or control some or all of the UE low latency communications functions or aspects described in FIGS. 1-10 related to using low latency communication in a wireless communications system supporting having multiple latencies in transmissions. For example, the UE fast access module 1340 may be configured to transmit a trigger to request fast access, monitor trigger resources, and process received symbols or generate symbols that may be included in one or more low latency mode subframes. The UE fast access module 1340 may include a UE trigger resource configuration module 1350 to configure the UE 115-*b* for monitoring a trigger resource or transmitting a trigger on a trigger resource, a UE trigger monitor module 1355 configured to monitor the configured trigger resource for any received triggers to switch to a low latency communications mode, and UE clock module 1360 configured to provide clock adaptation based on symbol duration. The UE fast access module 1340, or portions of it, may include a processor or some or all of the functionality of the UE fast access module 1340 may be performed by the processor module 1310 or in connection with the processor module 1310.

Figure 14:
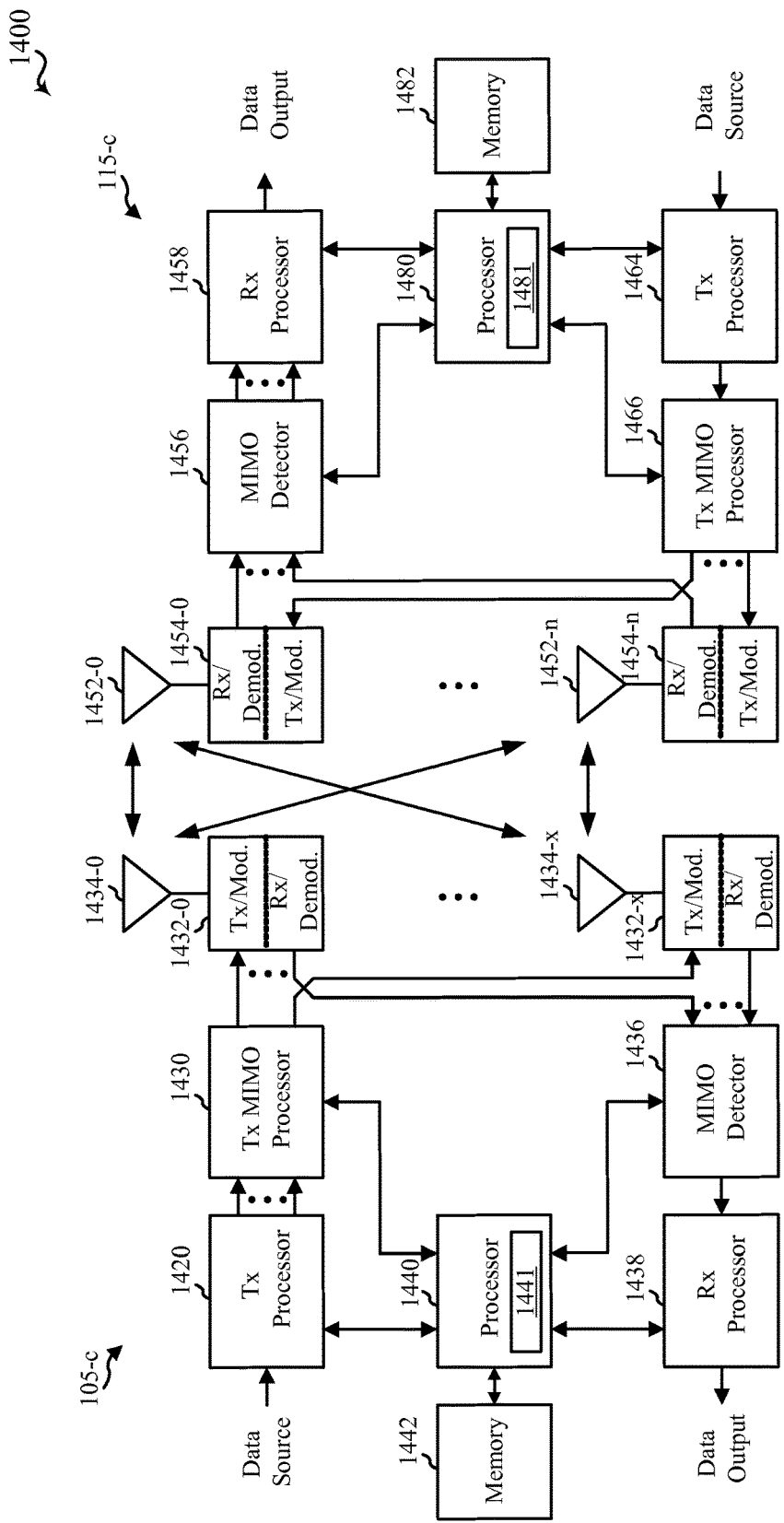
FIG. 14 is a block diagram conceptually illustrating an example of a UE and an eNB, in accordance with aspects of the present disclosure.

Turning next to FIG. 14, a block diagram of a multiple-input multiple-output (MIMO) communication system 1400 is shown including an eNB 105-*c* and a UE 115-*c*. The eNB 105-*c* and the UE 115-*c* may support low latency communications in a wireless communications system. The eNB 105-*c* may be an example of one or more aspects of the access points, eNBs or devices 105, 1105, or 1155 described with reference to FIG. 1, 11A, 11B, or 12, while the UE 115-*c* may be an example of one or more aspects of the UEs or devices 115, 1105, or 1155 described with reference to FIG. 1, 11A, 11B, or 13. The system 1400 may illustrate aspects of the wireless communications system 100 described with reference to FIG. 1, and may support low latency transmissions across different subsets of nodes during different time periods such as described above with reference to FIGS. 1-13.

The eNB 105-*c* may be equipped with antennas 1434-0 through 1434-*x*, and the UE 115-*c* may be equipped with antennas 1452-0 through 1452-*n*. In the system 1400, the eNB 105-*c* may be able to send data over multiple communication links at the same time. Each communication link may be called a "layer" and the "rank" of the communication link may indicate the number of layers used for communication. For example, in a 2×2 MIMO system where eNB 105-*c* transmits two "layers," the rank of the communication link between the eNB 105-*c* and the UE 115-*c* may be two.

At the eNB 105-*c*, a transmit (Tx) processor 1420 may receive data from a data source. The transmit processor 1420 may process the data. The transmit processor 1420 may also generate reference symbols or a cell-specific reference signal. A transmit (Tx) MIMO processor 1430 may perform spatial processing (e.g., precoding) on data symbols, control symbols, or reference symbols, if applicable, and may provide output symbol streams to the transmit (Tx) modulators 1432-0 through 1432-*x*. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink (DL) signal. In one example, DL signals from modulators 1432-0 through 1432-*x* may be transmitted via the antennas 1434-0 through 1434-*x*, respectively.

At the UE 115-*c*, the antennas 1452-0 through 1452-*n* may receive the DL signals from the eNB 105-*c* and may provide the received signals to the receive (Rx) demodulators 1454-0 through 1454-*n*, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all the demodulators 1454-0 through 1454-*n*, perform MIMO detection on the received symbols if applicable, and provide detected symbols. A receive (Rx) processor 1458 may process (e.g., demodulate, deinterleave, and decode) the detected symbols, providing decoded data for the UE 115-*c* to a data output, and provide decoded control information to a processor 1480, or memory 1482. The processor 1480 may include a module or function 1481 that may perform various functions related to low latency transmissions in a wireless communications system. For example, the module or function 1481 may perform some or all of the functions of the fast access module 1120 described with reference to FIG. 11A or 11B, or of the eNB fast access module 1270 described with reference to FIG. 12.

On the uplink (UL), at the UE 115-*c*, a transmit (Tx) processor 1464 may receive and process data from a data source. The transmit processor 1464 may also generate reference symbols for a reference signal. The symbols from the transmit processor 1464 may be precoded by a transmit (Tx) MIMO processor 1466 if applicable, further processed by the transmit (Tx) modulators 1454-0 through 1454-*n* (e.g., for SC-FDMA, etc.), and be transmitted to the eNB 105-*c* in accordance with the transmission parameters received from the eNB 105-*c*. At the eNB 105-*c*, the UL signals from the UE 115-*c* may be received by the antennas 1434, processed by the receiver (Rx) demodulators 1432, detected by a MIMO detector 1436 if applicable, and further processed by a receive (Rx) processor 1438. The receive processor 1438 may provide decoded data to a data output and to the processor 1440, or memory 1442. The processor 1440 may include a module or function 1441 that may perform various aspects related to low latency transmissions in a wireless communications system. For example, the module or function 1441 may perform some or all of the functions of the fast access module 1120 described with reference to FIG. 11A or 11B, or of the UE fast access module 1340 described with reference to FIG. 13.

The components of the eNB 105-*c* may, individually or collectively, be implemented with one or more ASICs adapted to perform some or all of the applicable functions in hardware. Each of the noted modules may be a means for performing one or more functions related to operation of the system 1400. Similarly, the components of the UE 115-*c* may, individually or collectively, be implemented with one or more ASICs adapted to perform some or all of the applicable functions in hardware. Each of the noted components may be a means for performing one or more functions related to operation of the system 1400.

Figure 15:
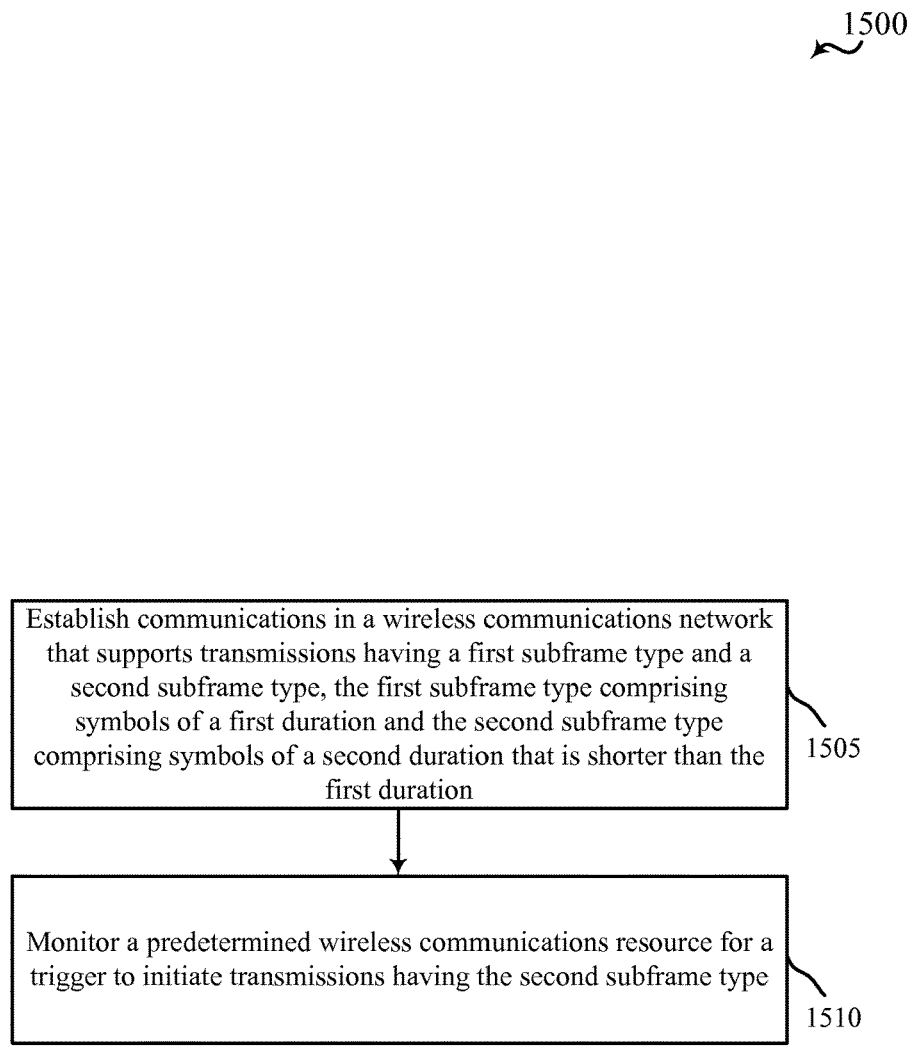
FIG. 15 is a flowchart conceptually illustrating an example of a method of wireless communication, in accordance with aspects of the present disclosure.

FIG. 15 is a flowchart conceptually illustrating an example of a method of wireless communication, in accordance with aspects of the present disclosure. For clarity, the method 1500 is described below with reference to ones of the base stations, eNBs, UEs, or devices 105, 115, 1105, or 1155 described with reference to FIG. 1, 11A, 11B, 12, 13, or 14. In one example, an eNB, UE, or device may execute one or more sets of codes to control the functional elements of the eNB, UE, or device to perform the functions described below.

At block 1505, an eNB, UE, or device may establish communications in a wireless communications network that supports transmissions having a first subframe type and a second subframe type, the first subframe type comprising symbols of a first duration and the second subframe type comprising symbols of a second duration that is shorter than the first duration. The operation(s) at block 1505 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1510, the eNB, UE, or device may monitor a predetermined wireless communications resource for a trigger to initiate transmissions having the second subframe type. The operation(s) at block 1510 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14. It should be noted that the method 1500 is just one implementation and that the operations of the method 1500 may be rearranged or otherwise modified such that other implementations are possible.

Figure 16:
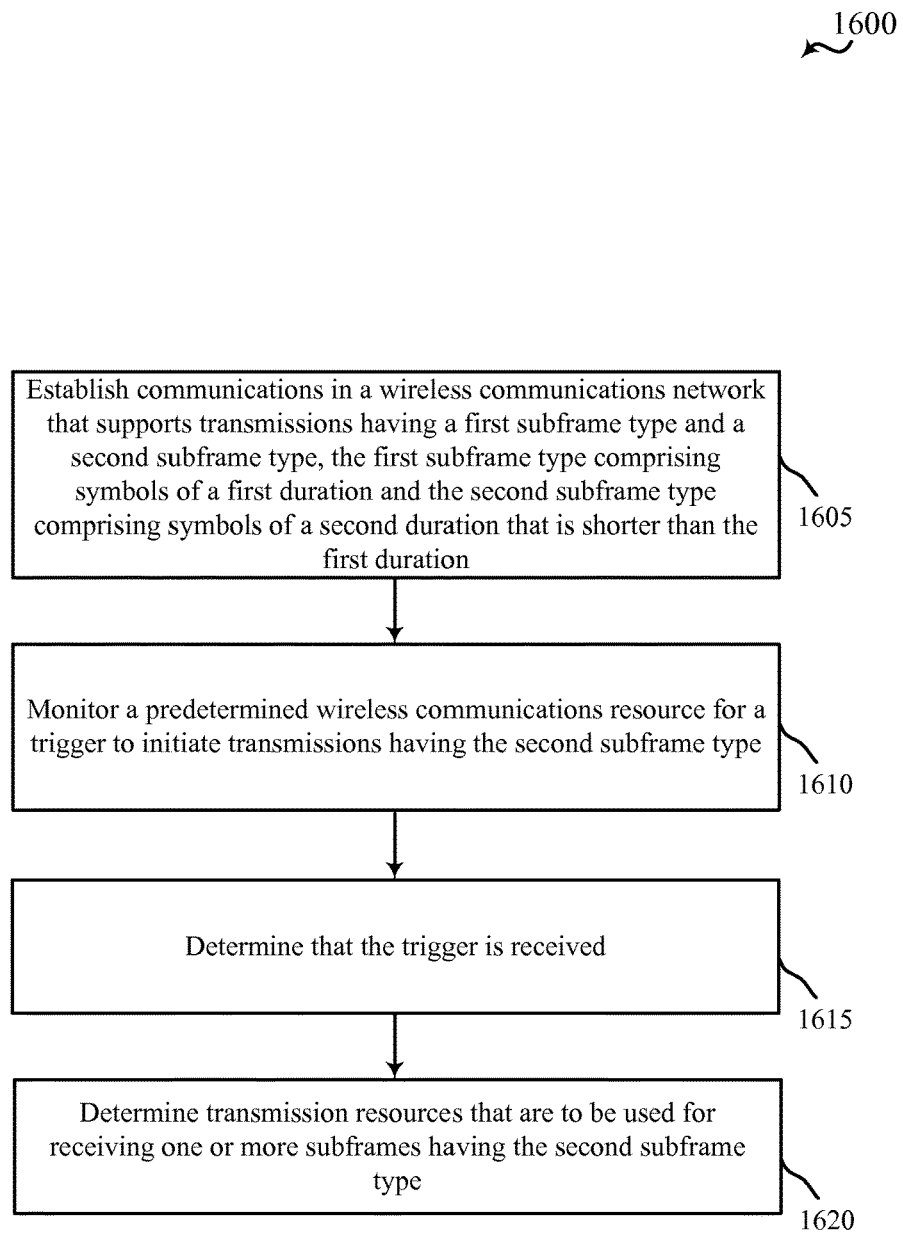
FIG. 16 is a flowchart conceptually illustrating an example of a method of wireless communication, in accordance with aspects of the present disclosure.

FIG. 16 is a flowchart conceptually illustrating an example of a method of wireless communication, in accordance with aspects of the present disclosure. For clarity, the method 1600 is described below with reference to one of the base stations, eNBs, UEs, or devices 105, 115, 1105, or 1155 described with reference to FIG. 1, 11A, 11B, 12, 13, or 15. In one example, an eNB, UE, or device may execute one or more sets of codes to control the functional elements of the eNB, UE, or device to perform the functions described below.

At block 1605, an eNB, UE, or device may establish communications in a wireless communications network that supports transmissions having a first subframe type and a second subframe type, the first subframe type comprising symbols of a first duration and the second subframe type comprising symbols of a second duration that is shorter than the first duration. The operation(s) at block 1605 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1610, the eNB, UE, or device may monitor a predetermined wireless communications resource for a trigger to initiate transmissions having the second subframe type. The operation(s) at block 1610 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14. It should be noted that the method 1600 is just one implementation and that the operations of the method 1600 may be rearranged or otherwise modified such that other implementations are possible.

At block 1615, the eNB, UE, or device may determine that the trigger is received. The operation(s) at block 1615 may in some cases be performed using fast access module 1120 in conjunction with trigger resource configuration module 1170 and receiver modules 1110, described with reference to FIG. 11A or 11B, the eNB fast access module 1270, transceiver module(s) 1255 and antenna(s) 1260, described with reference to FIG. 12, the UE fast access module 1340, transceiver module(s) 1370 and antenna(s) 1380, described with reference to FIG. 13, the processor 1480 or the processor 1440 and related components described with reference to FIG. 14.

At block 1620, the eNB, UE, or device may determine transmission resources that are to be used for receiving one or more subframes having the second subframe type. The operation(s) at block 1620 may in some cases be performed using fast access module 1120 described with reference to FIG. 11A or 11B, the eNB fast access module 1270, transceiver module(s) 1255, and antenna(s) 1260, described with reference to FIG. 12, the UE fast access module 1340, transceiver module(s) 1370, and antenna(s) 1380, described with reference to FIG. 13, the processor 1480 or the processor 1440 and related components described with reference to FIG. 14. It should be noted that the method 1600 is just one implementation and that the operations of the method 1600 may be rearranged or otherwise modified such that other implementations are possible.

Figure 17:
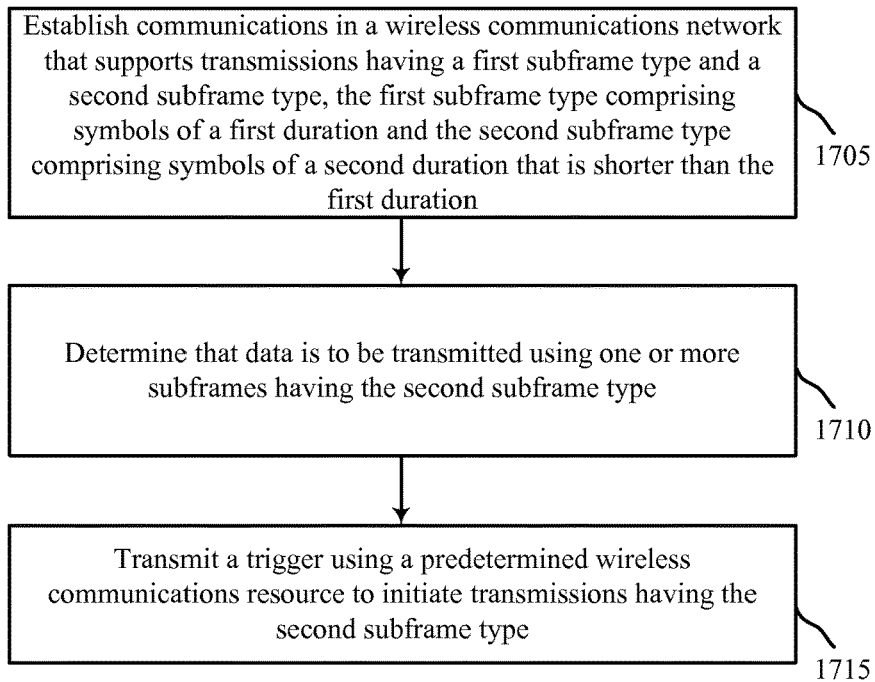
FIG. 17 is a flowchart conceptually illustrating an example of a method of wireless communication, in accordance with aspects of the present disclosure.

FIG. 17 is a flowchart conceptually illustrating an example of a method of wireless communication, in accordance with aspects of the present disclosure. For clarity, the method 1700 is described below with reference to ones of the access points, eNBs, UEs, or devices 105, 115, 1105, or 1155 described with reference to FIG. 1, 11A, 11B, 12, 13, or 15. In one example, an eNB, UE, or device may execute one or more sets of codes to control the functional elements of the eNB, UE, or device to perform the functions described below.

At block 1705, an eNB, UE, or device may establish communications in a wireless communications network that supports transmissions having a first subframe type and a second subframe type, the first subframe type comprising symbols of a first duration and the second subframe type comprising symbols of a second duration that is shorter than the first duration. The operation(s) at block 1705 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1710, the eNB, UE, or device may determine that data is to be transmitted using one or more subframes having the second subframe type. The operation(s) at block 1710 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1715, the eNB, UE, or device may transmit a trigger using a predetermined wireless communications resource to initiate transmissions having the second subframe type. The operation(s) at block 1715 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14. It should be noted that the method 1700 is just one implementation and that the operations of the method 1700 may be rearranged or otherwise modified such that other implementations are possible.

Figure 18:
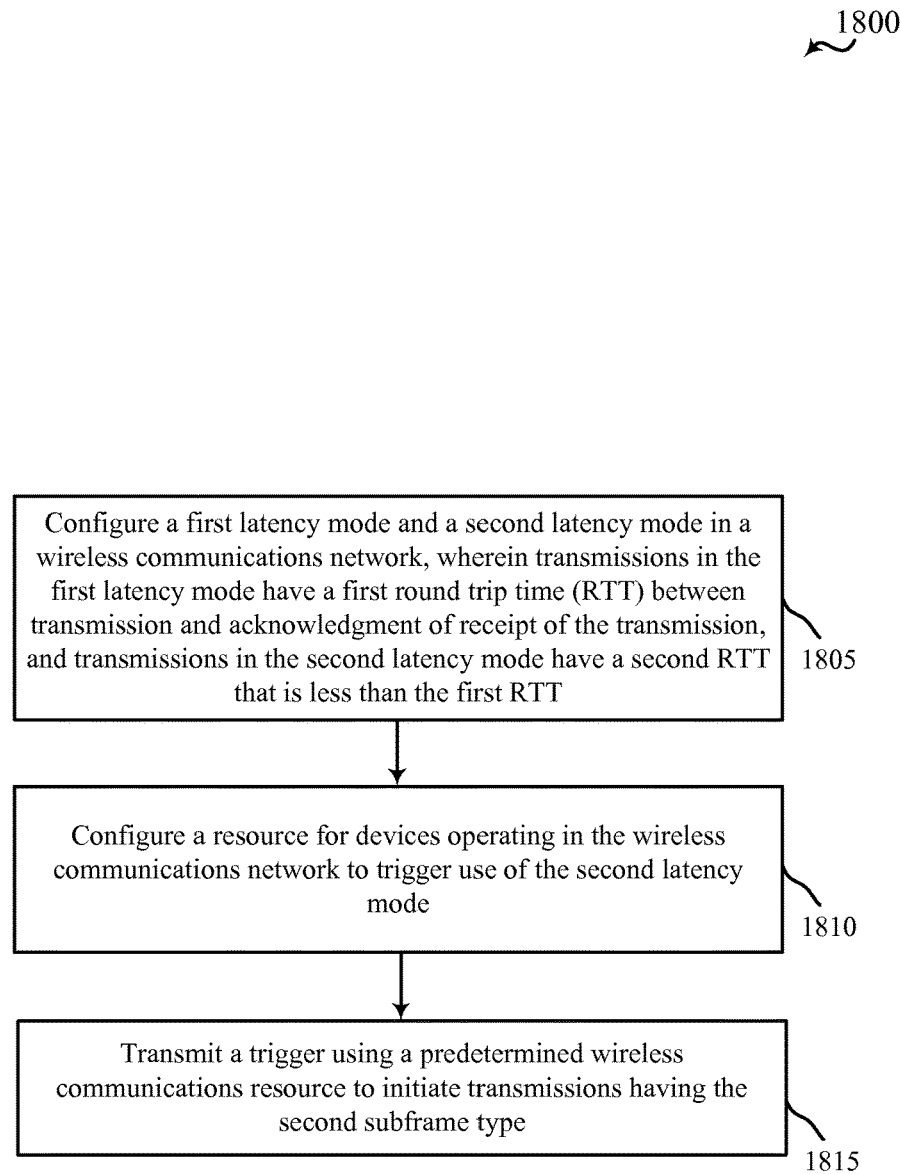
FIG. 18 is a flowchart conceptually illustrating an example of a method of wireless communication, in accordance with aspects of the present disclosure.

FIG. 18 is a flowchart conceptually illustrating an example of a method of wireless communication, in accordance with aspects of the present disclosure. For clarity, the method 1800 is described below with reference to ones of the access points, eNBs, UEs, or devices 105, 115, 1105, or 1155 described with reference to FIG. 1, 11A, 11B, 12, 13, or 15. In one example, an eNB, UE, or device may execute one or more sets of codes to control the functional elements of the eNB, UE, or device to perform the functions described below.

At block 1805, an eNB, UE, or device may configure a first latency mode and a second latency mode in a wireless communications network, wherein transmissions in the first latency mode have a first round trip time (RTT) between transmission and acknowledgment of receipt of the transmission, and transmissions in the second latency mode have a second RTT that is less than the first RTT. The operation(s) at block 1805 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1810, the eNB, UE, or device may configure a resource for devices operating in the wireless communications network to trigger use of the second latency mode. The operation(s) at block 1810 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14.

At block 1815, the eNB, UE, or device may transmit a trigger using a predetermined wireless communications resource to initiate transmissions having the second subframe type. The operation(s) at block 1815 may in some cases be performed using the fast access module 1120 described with reference to FIG. 11A or 11B, the eNB fast access module 1270 described with reference to FIG. 12, the UE fast access module 1340 described with reference to FIG. 13, the processor 1480 or the processor 1440 and related components described with reference to FIG. 14. It should be noted that the method 1800 is just one implementation and that the operations of the method 1800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
    establishing communications in a wireless communications network that supports transmissions having a first subframe type and transmissions having a second subframe type for wideband fast communications in a frame, the first subframe type comprising symbols of a first duration and the second subframe type for wideband fast communications comprising symbols of a second duration that is shorter than the first duration;
    monitoring, in a subframe having the first subframe type and in the frame, a predetermined wireless communications resource for a trigger to switch to transmissions having the second subframe type for wideband fast communications in a subsequent subframe in the frame;
    determining that the trigger is received in the subframe having the first subframe type and in the frame; and
    receiving, in the subsequent subframe in the frame in which the trigger is received in the first subframe type, the transmissions having the second subframe type for wideband fast communications based at least in part on the trigger, wherein a latency between the determining and receiving is less than a latency between initiating transmissions having the first subframe type and receiving transmissions having the first subframe type.

2. The method of claim 1, wherein the monitoring comprises monitoring a dedicated frequency resource for the trigger, and wherein the dedicated frequency resource comprises a dedicated frequency division multiplexing (FDM) subband continuously available for the monitoring.

3. The method of claim 1, wherein the monitoring comprises monitoring a dedicated frequency resource for the trigger, and wherein a bandwidth of the dedicated frequency resource is based on a number of devices configured to transmit or receive the trigger using the dedicated frequency resource.

4. The method of claim 1, wherein the monitoring comprises monitoring a dedicated frequency resource for the trigger, and wherein the dedicated frequency resource comprises two or more discontiguous resource blocks of a FDM resource.

5. The method of claim 1, wherein the monitoring comprises:
    monitoring a dedicated time resource for the trigger wherein the dedicated time resource comprises a predefined portion of a time division multiplexing (TDM) subframe, the predefined portion comprising one or more symbols of the TDM subframe having the first duration, wherein the one or more symbols of the TDM subframe comprise a first symbol of the TDM subframe and a second symbol of the TDM subframe, and wherein at least one subsequent symbol of the TDM subframe following the one or more symbols has the second duration.

6. The method of claim 1, wherein the monitoring is performed by a user equipment (UE), and wherein the method further comprises:
    determining, based at least in part on the received trigger in the frame, transmission resources that are to be used for receiving one or more subframes having the second subframe type and in the frame at the UE.

7. The method of claim 6, wherein the determining that the trigger is received comprises one or more of:
    determining that the trigger is received on a predefined resource associated with the UE; or
    determining that the trigger includes an identification that identifies the UE.

8. The method of claim 1, wherein the monitoring is performed by a base station, and wherein the method further comprises:
    determining that the trigger is received from a user equipment (UE);
    transmitting an assignment of resources to the UE for transmitting one or more subframes having the second subframe type.

9. The method of claim 8, wherein the trigger comprises one or more of:
    a UE identification;
    a delay requirement; or
    a bandwidth requirement.

10. The method of claim 8, wherein the determining that the trigger is received from the UE comprises:
    determining that two or more triggers are received from two or more UEs; and
    resolving contention between the two or more UEs,
    wherein the transmitting the assignment comprises transmitting the assignment of resources to one of the two or more UEs responsive to the resolving contention between the two or more UEs.

11. The method of claim 1, wherein the monitoring is performed by a base station, and wherein the method further comprises:
    determining that the trigger is received from a user equipment (UE); and
    receiving an autonomous transmission from the UE comprising subframes having the second subframe type.

* * * * *